United States Patent
Raha et al.

(10) Patent No.: US 12,367,380 B2
(45) Date of Patent: Jul. 22, 2025

(54) SYSTEM AND METHOD FOR BALANCING SPARSITY IN WEIGHTS FOR ACCELERATING DEEP NEURAL NETWORKS

(71) Applicant: Intel Corporation, Santa Clara, CA (US)

(72) Inventors: Arnab Raha, Santa Clara, CA (US); Debabrata Mohapatra, San Jose, CA (US); Deepak Abraham Mathaikutty, Chandler, AZ (US); Raymond Jit-Hung Sung, San Francisco, CA (US); Cormac Michael Brick, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 641 days.

(21) Appl. No.: 17/534,976

(22) Filed: Nov. 24, 2021

(65) Prior Publication Data
US 2022/0083843 A1   Mar. 17, 2022

(51) Int. Cl.
  *G06N 3/048*   (2023.01)
  *G06F 7/76*   (2006.01)

(52) U.S. Cl.
  CPC ............... *G06N 3/048* (2023.01); *G06F 7/76* (2013.01)

(58) Field of Classification Search
  CPC .................................. G06N 3/048; G06F 7/76
  USPC .......................................................... 706/15
  See application file for complete search history.

(56) References Cited

U.S. PATENT DOCUMENTS

| | | | |
|---|---|---|---|
| 2019/0115933 A1* | 4/2019 | Chen | .................. G06N 3/04 |
| 2019/0340511 A1 | 11/2019 | Yous et al. | |
| 2020/0134417 A1 | 4/2020 | Mohapatra et al. | |
| 2020/0228137 A1 | 7/2020 | Chinya et al. | |
| 2020/0410327 A1 | 12/2020 | Chinya et al. | |
| 2021/0042617 A1 | 2/2021 | Chinya et al. | |
| 2021/0397414 A1 | 12/2021 | Raha et al. | |
| 2022/0083843 A1 | 3/2022 | Raha et al. | |

OTHER PUBLICATIONS

Hoefler et al., "Sparsity in deep learning: pruning and growth for efficient inference and training in neural networks", Journal of Machine Learning Research 23 (2021) 1-124, 2021 (Year: 2021).*

(Continued)

*Primary Examiner* — Tsu-Chang Lee
(74) *Attorney, Agent, or Firm* — Akona IP PC

(57) ABSTRACT

An apparatus is provided to access a weight vector of a layer in a sequence of layers in the DNN. The weight vector includes a first sequence of weights having different values. A bitmap is generated based on the weight vector. The bitmap includes a second sequence of bitmap elements. Each bitmap element corresponds to a different weight and has a value determined based at least on the value of the corresponding weight. The index of each bitmap element in the second sequence matches the index of the corresponding weight in the first sequence. A new bitmap is generated by rearranging the bitmap elements in the second sequence based on the values of the bitmap elements. The weight vector is rearranged based on the new bitmap. The rearranged weight vector is divided into subsets, each of which is assigned to a different PE for a MAC operation.

25 Claims, 13 Drawing Sheets

(56) References Cited

OTHER PUBLICATIONS

Liu et al., "Sparse Convolutional Neural Networks", CVPR2015, pp. 806-814, 2015 (Year: 2015).*

Adavally, Shashank et al "ExPress: Simultaneously Achieving Storage, Execution and Energy Efficiencies in Moderately Sparse Matrix Computations", memsys 2020, ACM, Mar. 21, 2021, pp. 1-15.

Hoefler, Torsten et al "Sparsity in Deep Learning: Pruning and growth for efficient inference and training in neural networks", https://arxiv.org/abs/2102.00554v1, Jan. 2021, pp. 1-90.

Hosny, Abdelrahman et al "BitTrain : Sparse bitmap compression for memory-efficient training on the edge", https://arxiv.org/abs/2110.15362, Oct. 2021, pp. 1-12.

Kipf, Andreas et al, "Learned Cardinalities: Estimating correlated joins with deep learning", https://arxiv.org/abs/1809.00677, Dec. 2018 pp. 1-11.

Sze, Vivienne et al "Efficient Processing of Deep Neural Networks: A Tutorial and Survey", retrieved from https://doi.org/10.48550/arXiv.1703.0903 on Sep. 16, 2022, 32 pages.

Yao, Z., et al., "Balanced Sparsity for Efficient DNN Inference on GPU," Proceedings of the AAAI Conference on Artificial Intelligence; pp. 5676-5683 (2019).

Chen, Y, et al., "Eyeriss v2: A Flexible Accelerator for Emerging Deep Neural Networks on Mobile Devices," IEEE Journal on Emerging and Selected Topics in Circuits and Systems, vol. 9, No. 2; 21 pages (2019).

Chen, Y, et al., "Eyeriss: An Energy-Efficient Reconfigurable Accelerator for Deep Convolutional Neural Networks," 2016 IEEE International Solid-State Circuit Conference (ISSCC) pp. 261-263 (2016).

Jouppi, N., et al., "Ten Lessons From Three Generations Shaped Google's TPUv4i," Industrial Product, ACM/IEEE 48th Annual International Symposium on Computer Architecture (ISCA); 14 pages (2021).

Nvidia Ampere Architecture; 10 pages; https://www.nvidia.com/en-us/data-center/ampere-architecture (obtained Dec. 27, 2021).

Parashar, A., et ak., "SCNN: An Accelerator for Compressed-sparse Convolutional Neural Networks," ACM/IEEE 44th Annual International Symposium on Computer Architecture (ISCA), Toronto, ON, Canada; pp. 27-40 (Jun. 24-28, 2017).

Park, Y., et al., "GRLC: Grid-based Run-length Compression for Energy-efficient CNN Accelerator," Proceedings of the 2020 ACM/IEEE International Symposium on Low Power Electronics and Design (ISLPED '20) pp. 91-96 (Aug. 10-20, 2020).

Sato, N., et al., "Techniques for Exploiting the Sparsity or the Network Admittance Matrix," IEEE Trans. Power and Apparatus Systems; pp. 944-950 (Dec. 1963).

Tinney, W., et al., "Direct Solutions of Sparse Network Equations by Optimally Ordered Triangular Factorization," Proceedings of the IEEE; vol. 55, No. 11; pp. 1801-1809 (Nov. 1967).

\* cited by examiner

SYSTEM AND METHOD FOR BALANCING SPARSITY IN WEIGHTS FOR ACCELERATING DEEP NEURAL NETWORKS

TECHNICAL FIELD

This disclosure relates generally to neural networks, and more specifically, to accelerating deep neural networks (DNNs).

BACKGROUND

Deep neural networks are used extensively for a variety of artificial intelligence applications ranging from computer vision to speech recognition and natural language processing due to their ability to achieve high accuracy. However, the high accuracy comes at the expense of significant computation cost. DNNs have extremely high computing demands as each inference can require hundreds of millions of MAC (multiply-accumulate) operations as well as hundreds of millions of filter weights to be stored for classification or detection. Therefore, techniques to improve efficiency of DNNs are needed.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Overview

Figure 1:
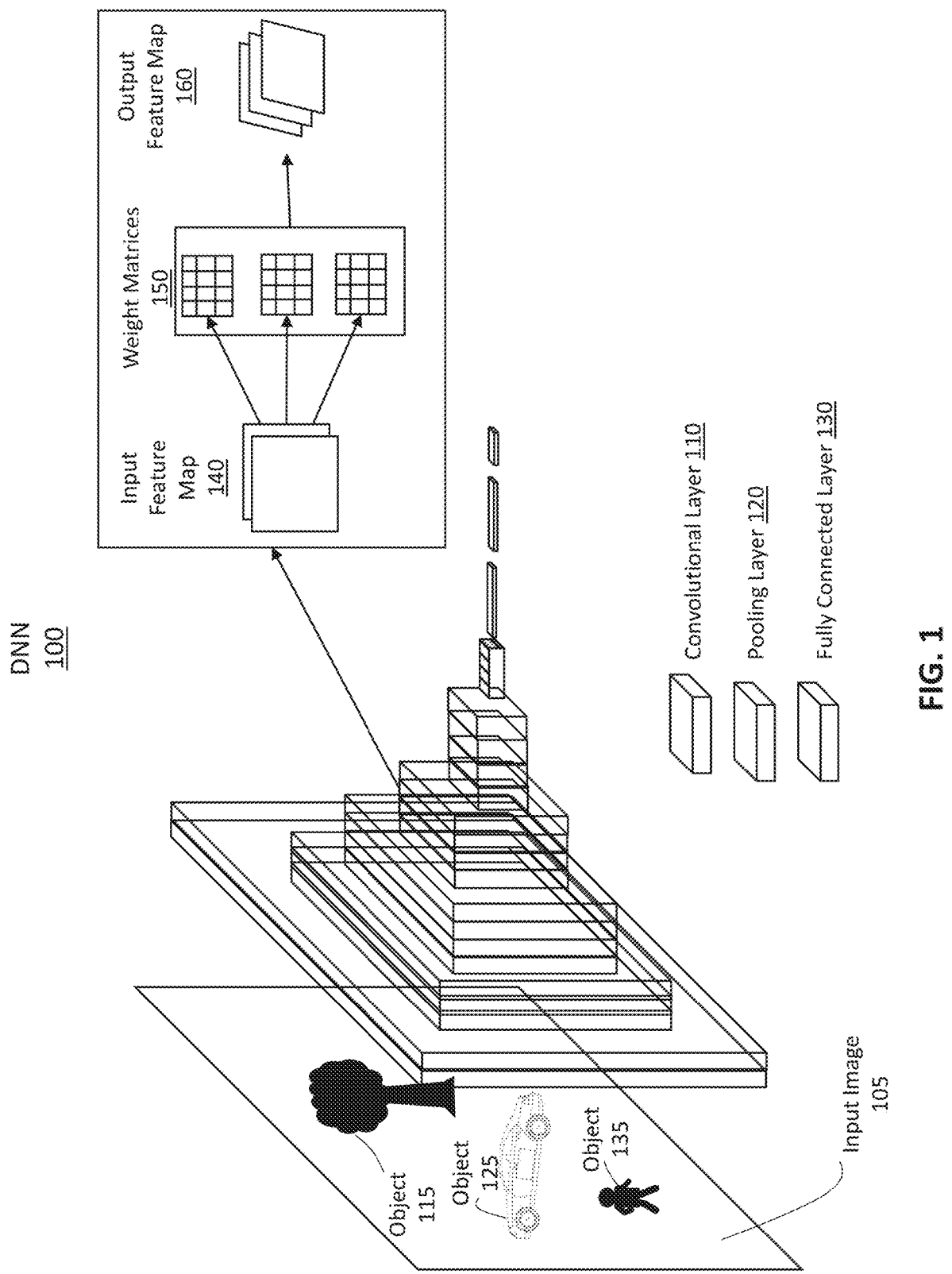
FIG. 1 illustrates an architecture of an example DNN, in accordance with various embodiments.

Deep learning (DL) models are characterized by the ability to produce effective abstract representations of data using automatic latent feature extraction. To accomplish this, DNNs are substantially more complex compared to more traditional machine learning techniques and require many orders of magnitude more parameters to be trained. High-end Graphical Processing Units (GPUs) and ASIC (application-specific integrated circuit)-based DNN accelerators are suitable to execute these type of workloads as they consist of thousands of parallel MAC units that can simultaneously operate and produce the output in lesser time. However, these GPU and ASIC-based execution platforms usually have very high-power consumption that make then unsuitable for deployment in highly energy constrained systems where power and area budgets are extremely limited.

An efficient technique to improve the performance and energy consumption of DNN accelerators is by exploiting the property of sparsity that is present in abundance in the networks. Sparsity refers to the existence of zeros in weights and activations in DNNs. Zero valued activations in DNNs stem from the processing of the layers through activation functions, whereas zero valued weights usually arise due to filter pruning or due to the process of quantization in DNNs. These zero valued activations and weights do not contribute towards the result during MAC operations in convolutional and fully-connected layers and hence, they can be skipped during both computation and storage. Towards this end, machine learning accelerators can exploit this sparsity available in activations and weights to achieve significant speedup during compute, which leads to power savings because the same work can be accomplished using less energy, as well as reducing the storage requirements for the weights (and activations) via efficient compression schemes. Both reducing the total amount of data transfer across memory hierarchies and decreasing the overall compute time are critical to improving energy efficiency in machine learning accelerators.

Even though some DNN accelerators can improve throughput via sparsity acceleration, there can occur many scenarios where the random distribution of sparse data within the processing elements (PEs) of a DNN accelerator may result in negligible or even zero speedup due to sparsity. Most sparse DNN accelerators rarely achieve the maximum speedup that can be obtained from skipping computation on sparse data due to the various factors including: the underlying DNN dataflow, synchronization barriers during the drain phase (extraction of output points from the computation units to upper memory hierarchies) and the overheads associated with splitting work into multiple smaller tasks among multiple PEs. The synchronization requirement during the drain operation mainly stems from the final output points (corresponding to output channels) needing to be extracted at the same time so that they can be compressed or packed together for storage before they form the activations for the next DNN layer.

Embodiments of the present invention relate to a sparsity balancing system capable of balancing sparsity in weights to improve efficiency of DNN accelerators. The sparsity balancing system uses bitmaps to rearrange weights to achieve an even (or almost even) distribution of sparse data (i.e., zero values) in the weights so that the PEs processing the can have balanced workloads. The sparsity balancing system is also capable of combined sparsity balancing, which includes both sparsity balancing in weights and sparsity balancing in activations.

In some embodiments, the sparsity balancing system generates a bitmap based on a weight vector. The weight vector includes a sequence of weights. The weight vector may be extracted from one or more filters of a DNN layer. A weight may have a non-zero value or zero value. The bitmap includes a sequence of bitmap elements, each of which has a value determined based on the value of a different weight. For instance, the bitmap element for a non-zero valued weight has a value of one, but the bitmap element for a zero valued weight has a value of zero. The index of a bitmap element in the bitmap matches the index of the corresponding weight in the weight vector, i.e., the first bitmap element in the bitmap corresponds to the first weight in the weight vector, the second bitmap element in the bitmap corresponds to the second weight in the weight vector, and so on. The sparsity balancing system may generate the bitmap based on both weights and activations. Such a bitmap is referred to as a combined bitmap. The sparsity balancing system then rearranges the bitmap and generates a new bitmap.

In the process of rearranging the bitmap, the sparsity balancing system changes indices of at least some bitmap elements to achieve an even (or almost even) distribution of non-zero valued (or zero valued) bitmap elements in the new bitmap. For instance, the sparsity balancing system determines an interval number (such as a fixed interval number) based on a division operation on the total number of bitmap elements in the bitmap and non-zero valued (or zero valued) bitmap elements. The interval number may be an integer. The sparsity balancing system rearranges the bitmap so that there will be a non-zero valued (or zero valued) bitmap element for every interval number of bitmap elements. In some embodiments, the sparsity balancing system compares the number of non-zero valued bitmap elements and the number of zero-valued bitmap elements and selects the smaller number to do the division operation. Also, the sparsity balancing system targets at even distribution of non-zero valued bitmap elements when there are less non-zero valued bitmap elements than zero-valued bitmap elements, vice versa. That way, the rearrangement process can be more efficient. An even distribution of non-zero valued bitmap elements can result in an even distribution of zero valued bitmap elements. Similarly, an even distribution of zero valued bitmap elements can also result in an even distribution of non-zero valued bitmap elements.

After the new bitmap is generated, the sparsity balancing system can rearrange the weight vector based on the new bitmap. For instance, if a bitmap element is moved during the rearrangement process, the corresponding weight will be moved in the same way. Thus, the rearranged weight vector has an even (or almost even) distribution of non-zero valued weights. In some embodiments, the activation vector can also be arranged based on the new bitmap, e.g., in embodiments where the bitmap is a combined bitmap. Further, the sparsity balancing system divides the weight vector into subsets and assigned each subset to a different PE. As the rearranged weight vector (or both the rearranged weight vector and the rearranged activation vector) has an even (or almost even) distribution of non-zero valued weights, the PEs will have the same or similar workloads. Accordingly, there will be better synchronization between the MAC operations of the PEs. Therefore, the present invention alleviates or even eliminate sparsity bottlenecks arising from the synchronization requirement between multiple PEs in DNN accelerators.

For purposes of explanation, specific numbers, materials and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

The terms "substantially," "close/" "approximately," "near," and "about," generally refer to being within +/−20% of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

In addition, the terms "comprise," "comprising," "include," "including," "have," "having" or any other variation thereof, are intended to cover a non-exclusive inclusion. For example, a method, process, device, or sparsity balancing system that comprises a list of elements is not necessarily limited to only those elements but may include other elements not expressly listed or inherent to such method, process, device, or sparsity balancing system. Also, the term "or" refers to an inclusive "or" and not to an exclusive "or."

The sparsity balancing systems, methods and devices of this disclosure each have several innovative aspects, no single one of which is solely responsible for all desirable attributes disclosed herein. Details of one or more implementations of the subject matter described in this specification are set forth in the description below and the accompanying drawings.

Example DNN Architecture

FIG. 1 illustrates an architecture of an example DNN 100, in accordance with various embodiments. For purpose of illustration, the DNN 100 in FIG. 1 is a Visual Geometry Group (VGG)-based convolutional neural network (CNN). In other embodiments, the DNN 100 may be other types of DNNs. The DNN 100 is trained to receive images and output classifications of objects in the images. In the embodiment of FIG. 1, the DNN 100 receives an input image 105 that includes objects 115, 125, and 135. The DNN 100 includes a sequence of layers comprising a plurality of convolutional layers 110 (individually referred to as "convolutional layer 110"), a plurality of pooling layers 120 (individually referred to as "pooling layer 120"), and a plurality of fully connected layers 130 (individually referred to as "fully connected layer 130"). In other embodiments, the DNN 100 may include fewer, more, or different layers.

The convolutional layers 110 summarize the presence of features in the input image 105. The convolutional layers 110 function as feature extractors. The first layer of the DNN 100 is a convolutional layer 110. In an example, a convolutional layer 110 performs a convolution to an IFM 140 by using weight matrices 150, generates an OFM 160 from the convolution, and passes the OFM 160 to the next layer in the sequence. The IFM 140 may include a plurality of IFM matrices. The OFM 160 may include a plurality of OFM matrices. For the first convolutional layer 110, which is also the first layer of the DNN 100, the IFM 140 is the input image 105. For the other convolutional layers, the IFM 140 may be an output of another convolutional layer 110 or an output of a pooling layer 120. The convolution is a linear operation that involves the multiplication of the weight matrices 150 with the IFM 140. A filter may be a 2-dimensional array of weights. Weights of the filters can be initialized and updated by backpropagation using gradient descent. The magnitudes of the weights of the filters can indicate importance of the weight matrices 150 in extracting features from the IFM 140. A filter can be smaller than the IFM 140.

The multiplication applied between a filter-sized patch of the IFM 140 and a filter may be a dot product. A dot product is the element-wise multiplication between the filter-sized patch of the IFM 140 and the corresponding filter, which is then summed, always resulting in a single value. Because it results in a single value, the operation is often referred to as the "scalar product." Using a filter smaller than the IFM 140 is intentional as it allows the same filter (set of weights) to be multiplied by the IFM 140 multiple times at different points on the IFM 140. Specifically, the filter is applied systematically to each overlapping part or filter-sized patch of the IFM 140, left to right, top to bottom. The result from multiplying the filter with the IFM 140 one time is a single value. As the filter is applied multiple times to the IFM 140, the multiplication result is a two-dimensional array of output values that represent a filtering of the IFM 140. As such, the 2-dimensional output array from this operation is referred to a "feature map."

In some embodiments, the OFM 160 is passed through an activation function. An example activation function is the rectified linear activation function (ReLU). ReLU is a calculation that returns the value provided as input directly, or the value 0 if the input is 0 or less. The convolutional layer 110 may receive several images as input and calculates the convolution of each of them with each of the filters. This process can be repeated several times. For instance, the OFM 160 is passed to the subsequent convolutional layer 110 (i.e., the convolutional layer 110 following the convolutional layer 110 generating the OFM 160 in the sequence). The subsequent convolutional layers 110 performs a convolution on the OFM 160 with new filters and generates a new feature map. The new feature map may also be normalized and resized. The new feature map can be filtered again by a further subsequent convolutional layer 110, and so on.

In some embodiments, a convolutional layer 110 has four hyperparameters: the number of filters, the size F filters (e.g., a filter is of dimensions F×F×D pixels), the S step with which the window corresponding to the filter is dragged on the image (e.g., a step of 1 means moving the window one pixel at a time), and the zero-padding P (e.g., adding a black contour of P pixels thickness to the input image of the convolutional layer 110). The convolutional layers 110 may perform various types of convolutions, such as 2-dimensional convolution, dilated or atrous convolution, spatial separable convolution, depth-wise separable convolution, transposed convolution, and so on. The DNN 100 includes 16 convolutional layers 110. In other embodiments, the DNN 100 may include a different number of convolutional layers.

The pooling layers 120 downsample feature maps generated by the convolutional layers, e.g., by summarizing the presents of features in the patches of the feature maps. A pooling layer 120 is placed between two convolution layers 110: a preceding convolutional layer 110 (the convolution layer 110 preceding the pooling layer 120 in the sequence of layers) and a subsequent convolutional layer 110 (the convolution layer 110 subsequent to the pooling layer 120 in the sequence of layers). In some embodiments, a pooling layer 120 is added after a convolutional layer 110, e.g., after an activation function (e.g., ReLU) has been applied to the OFM 160.

A pooling layer 120 receives feature maps generated by the preceding convolution layer 110 and applies a pooling operation to the feature maps. The pooling operation reduces the size of the feature maps while preserving their important characteristics. Accordingly, the pooling operation improves the efficiency of the DNN and avoids over-learning. The pooling layers 120 may perform the pooling operation through average pooling (calculating the average value for each patch on the feature map), max pooling (calculating the maximum value for each patch of the feature map), or a combination of both. The size of the pooling operation is smaller than the size of the feature maps. In various embodiments, the pooling operation is 2×2 pixels applied with a stride of 2 pixels, so that the pooling operation reduces the size of a feature map by a factor of 2, e.g., the number of pixels or values in the feature map is reduced to one quarter the size. In an example, a pooling layer 120 applied to a feature map of 6×6 results in an output pooled feature map of 3×3. The output of the pooling layer 120 is inputted into the subsequent convolution layer 110 for further feature extraction. In some embodiments, the pooling layer 120 operates upon each feature map separately to create a new set of the same number of pooled feature maps.

The fully connected layers 130 are the last layers of the DNN. The fully connected layers 130 may be convolutional or not. The fully connected layers 130 receives an input vector. The input vector defines the output of the convolutional layers 110 and pooling layers 120 and includes the values of the last feature map generated by the last pooling layer 120 in the sequence. The fully connected layers 130 applies a linear combination and an activation function to the input vector and generates an output vector. The output vector may contain as many elements as there are classes: element i represents the probability that the image belongs to class i. Each element is therefore between 0 and 1, and the sum of all is worth 1. These probabilities are calculated by the last fully connected layer 130 by using a logistic function (binary classification) or a softmax function multi-class classification) as an activation function.

In some embodiments, the fully connected layers 130 classify the input image 105 and returns a vector of size N, where N is the number of classes in the image classification problem. In the embodiment of FIG. 1, N equals 3, as there are three objects 115, 125, and 135 in the input image. Each element of the vector indicates the probability for the input image 105 to belong to a class. To calculate the probabilities, the fully connected layers 130 multiply each input element by weight, makes the sum, and then applies an activation function (e.g., logistic if N=2, softmax if N>2). This is equivalent to multiplying the input vector by the matrix containing the weights. In an example, the output vector includes three probabilities: a first probability indicating the object 115 being a tree, a second probability indicating the object 125 being a car, and a third probability indicating the object 135 being a person. In other embodiments where the input image 105 includes different objects or a different number of objects, the output vector can be different.

Example Hardware Architecture of DNN Layer

Figure 2:
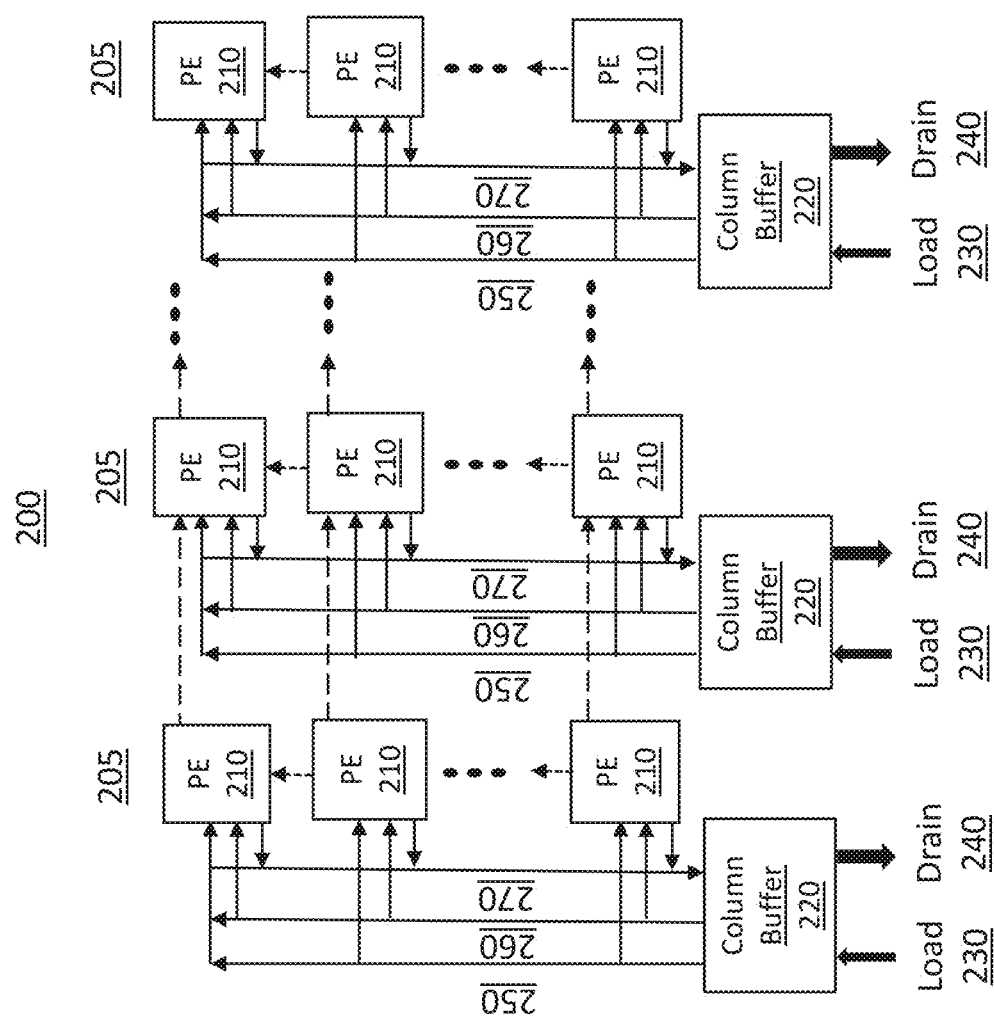
FIG. 2 illustrates a hardware architecture for a layer of a DNN, in accordance with various embodiments.

FIG. 2 illustrates a hardware architecture 200 for a layer of a DNN, in accordance with various embodiments. The hardware architecture 200 includes a plurality of PEs 210 (individually referred to as "PE 210") and column buffers 220 (individually referred to as "column buffer 220"). In other embodiments, the hardware architecture 200 includes other components, such as a static random-access memory (SRAM) for storing input and output of the layer. The hardware architecture 200 may also include a distribution unit for distributing data stored in the SRAM to the column buffers 220.

The PEs 210 perform multiply-accumulate (MAC) operations. The PEs 210 may also be referred to as neurons in the DNN. The PEs 210 receive the input and filters of the layer and generates the output of the layer through the multiply-accumulate operations. Each PE 210 has two input signals 250 and 260 and an output signal 270. The input signal 250, e.g., is a portion of the input (e.g., an input feature map) to the layer. The input signal 260 is a portion of the weights of the filters in the layer. The weights can have non-zero values and zero values. The values of the weights are determined during the process of training the DNN. The weights can be divided and assigned to the PEs based on bitmaps. More details regarding bitmaps are provided below in conjunction with FIG. 4.

Each PE 210 performs a multiply operation on the input signals 250 and 260. The PEs 210 are connected to each other, as indicated by the dash arrows in FIG. 2. The output signal of an PE 210 is sent to many other PEs 210 (and possibly back to itself) as input signals via the interconnections between PEs 210. The output signal 270 of an PE 210 may incorporate the output signals of one or more other PEs 210 through an accumulate operation of the PE 210. More details about the PEs 210 are described below in conjunction with FIG. 3.

In the embodiment of FIG. 2, the PEs 210 are arranged into columns 205 (individually referred to as "column 205"). The input and filters of the layer may be distributed to the PEs 210 based on the columns 205. For instance, each column 205 is associated with an input channel and an output channel of the layer. The PEs 210 in each column 205 uses a filter to convert the input channel to the output channel. In other embodiments, the input and filters of the layer may be distributed to the PEs 210 in different ways. Each column 205 has a column buffer 220. The column buffers 220 stores data provided to the PEs 210 and received from the PEs 210 for a short amount of time. Each column buffer 220 is associated with a load 230 and a drain 240. The data provided to the PEs 210 is transmitted to the column buffers 220 through the load 230. The data generated by the PEs 210 is extracted from the column buffers 220 through the drain 240. In some embodiments, data extracted from the column buffers 220 is sent to upper memory hierarchies, e.g., a SRAM, through the drain operation.

The drain operation does not start until all the PEs 210 in the column has finished their multiply-accumulate operations. However, different PEs 210 may take different amounts of times to finish their multiply-accumulate operations due to unbalanced sparsity in filter weights. For instance, given the sparsity in the weights of the filters, a PE 210 can receive a filter having a lower sparsity level than filters sent to the other PEs 210 in the same column 205. Lower sparsity level means there are more non-zero valued weights. As the PE 210 receives the filter having a lower sparsity level, the multiply-accumulate operation of the PE 210 will be slower than that of the second PE 210. Thus, the PE 210 becomes the bottleneck of the drain operation of the column 205. Similarly, a column 205 may be slower than the other columns and become the bottleneck of the draining operation of the whole layer. Therefore, the efficiency of the layer can be improved by improving the sparsity balance in filter weights. More details regarding the impact of sparsity balance on layer efficiency is described below in conjunction with FIGS. 5 and 6.

Figure 3:
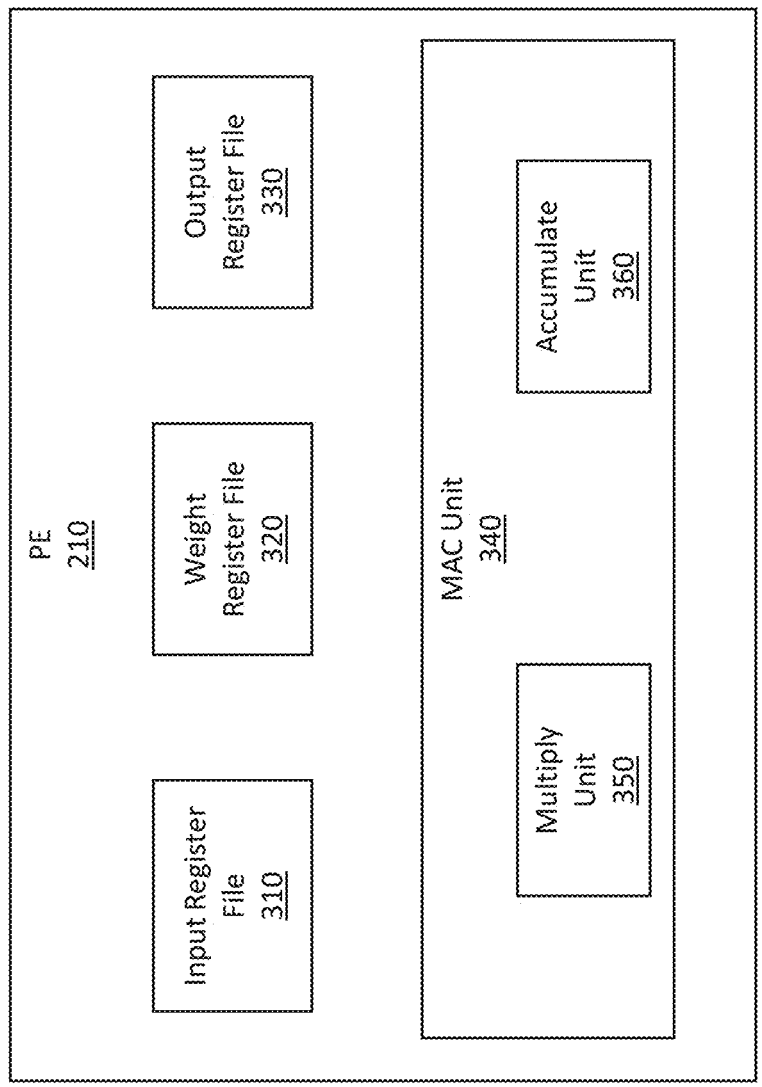
FIG. 3 is a block diagram of a processing element (PE), in accordance with various embodiments.

FIG. 3 is a block diagram of a PE 210, in accordance with various embodiments. The PE 210 in FIG. 3 includes an input register file 310, a weight register file 320, an output register file 330, and a MAC unit 340. In other embodiments, the PE 210 may include fewer, more, or different components.

The input register file 310 temporarily stores input signals received by the PE 210. The input feature data may include input feature data and output signals from other PEs 210. The weight register file 320 temporarily stores weights received by the PE 210. The output register file 310 temporarily stores output signals generated by the PE 210. For purpose of illustration and simplicity, the PE 210 in FIG. 3 includes one input register file 310, one weight register file 320, one output register file 330. In other embodiments, a PE 210 may include multiple register files for each type of data.

The MAC unit 340 performs MAC operations on data in the input register file 310 and weight register file 320. The MAC unit 340 includes a multiply unit 350 and an accumulate unit 360. The multiply unit 350 performs multiply operations on input feature data in the input register file 310 and weights in the weight register file 330. The amount of time needed by the multiply unit 350 for a multiple operation depends on the sparsity level of the weights used in the multiple operation. If the weights are denser (i.e., the sparsity level is lower), the multiply unit 350 needs more time to perform the multiple operation. The accumulate unit 360 performs accumulate operations on the output of the multiply unit 350 and outputs signals from other PEs. The output of the accumulate unit 360 is the output signal of the PE 210.

Example Process of Generating Bitmap

Figure 4:
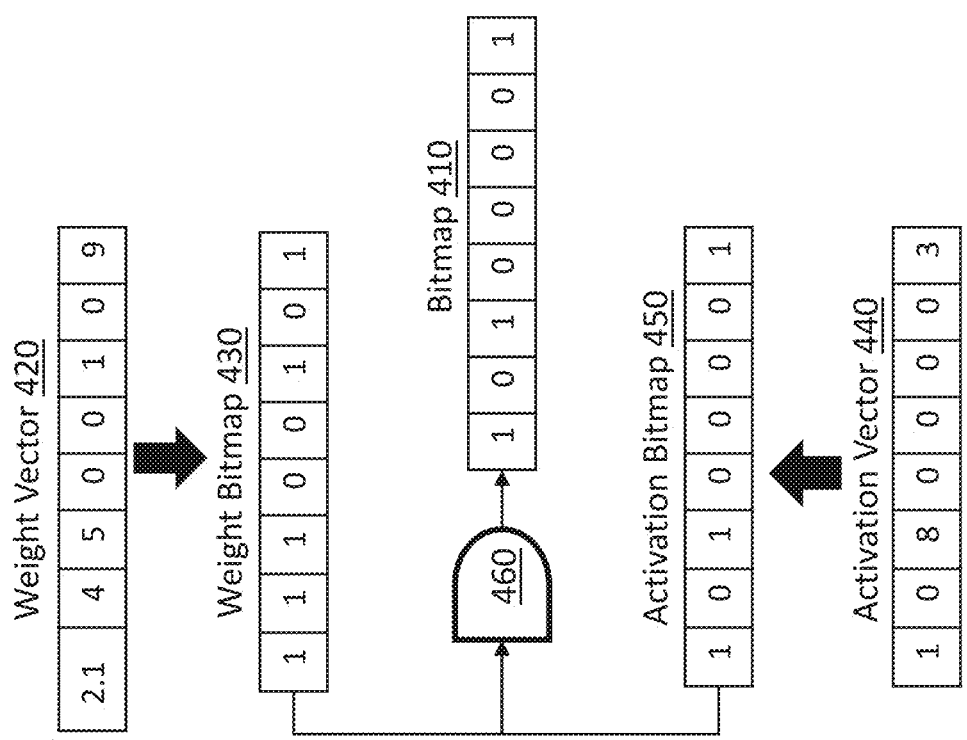
FIG. 4 illustrates a process of generating a bitmap, in accordance with various embodiments.

FIG. 4 illustrates a process of generating a bitmap 410, in accordance with various embodiments. The bitmap 410 is generated based on a weight vector 420 and an activation vector 440. For purpose of illustration and simplicity, the weight vector 420 and activation vector 440 each includes eight elements. In other embodiments, the weight vector 420 or activation vector 440 may include a different number of elements.

The weight vector 420 may be a vector in a weight matrix of a DNN layer. The weight matrix may be a portion of or a whole filter in the DNN layer. The weight vector 420 includes a sequence of eight elements, i.e., eight weights. Each weight has a value. The value may be zero, a non-zero integer, or a fraction. For instance, the first weight in the vector has a value of 2.1, the second weight in the vector has a value of 4, and so on. The fourth, fifth, and seventh weights have zero values. A weight bitmap 430 is generated from the weight vector 420. In some embodiments, the weight bitmap 430 is generated by converting each weight in the weight vector 420 into a weight bitmap element. The index of the weight bitmap element in the weight bitmap 430 matches the index of the corresponding weight in the weight vector 420. The weight bitmap element has a value determined based on the value of the weight: weight bitmap element for non-zero valued weights have values of 1 but weight bitmap element for zero valued weights have values of 0. For instance, as the value of the first weight is 2.1, the first weight bitmap element has a value of 1. As the value of the seventh weight is 0, the seventh weight bitmap element has a value of 0.

Similarly, an activation bitmap 450 is generated based on the activation vector 440. The activation vector 440 is a vector associated with an activation in the DNN layer. The activation bitmap 450 includes a sequence of eight activation bitmap elements, the indices and values of which are determined based on the elements of the activation vector 440.

Further, the bitmap 410 is generated by combining the weight bitmap 430 and activation bitmap 450. In FIG. 4, a multiply operation 460 is performed on the weight bitmap 430 and activation bitmap 450. The multiply operation 460 outputs the bitmap 450. The multiply operation 460 includes multiplying each weight bitmap element in the weight bitmap 430 by a corresponding activation bitmap element in the activation bitmap 450. The index of the activation bitmap element in the activation bitmap 450 matches the index of the weight bitmap element in the weight bitmap 430. For instance, the first weight bitmap element in the weight bitmap 430 is multiplied by the first activation bitmap element in the activation bitmap 450, the second weight bitmap element in the weight bitmap 430 is multiplied by the second activation bitmap element in the activation bitmap 450, and so on. Thus, a bitmap element in the bitmap 410 has a value of 0 as long as one of the corresponding weight bitmap element and activation bitmap element has a value of 0.

The bitmap 410 in FIG. 4 is generated based on both the weight vector 420 and activation vector 440. Thus, the bitmap 410 represents sparsity in both the weight vector 420 and activation vector 440. In other embodiments, the bitmap 410 may be generated based on the weight vector 420 but not based on the activation vector 440 and therefore, represent the sparsity in the weight vector 420 but not the sparsity in the activation vector 440

Example PEs With Unbalanced Workloads

Figure 5:
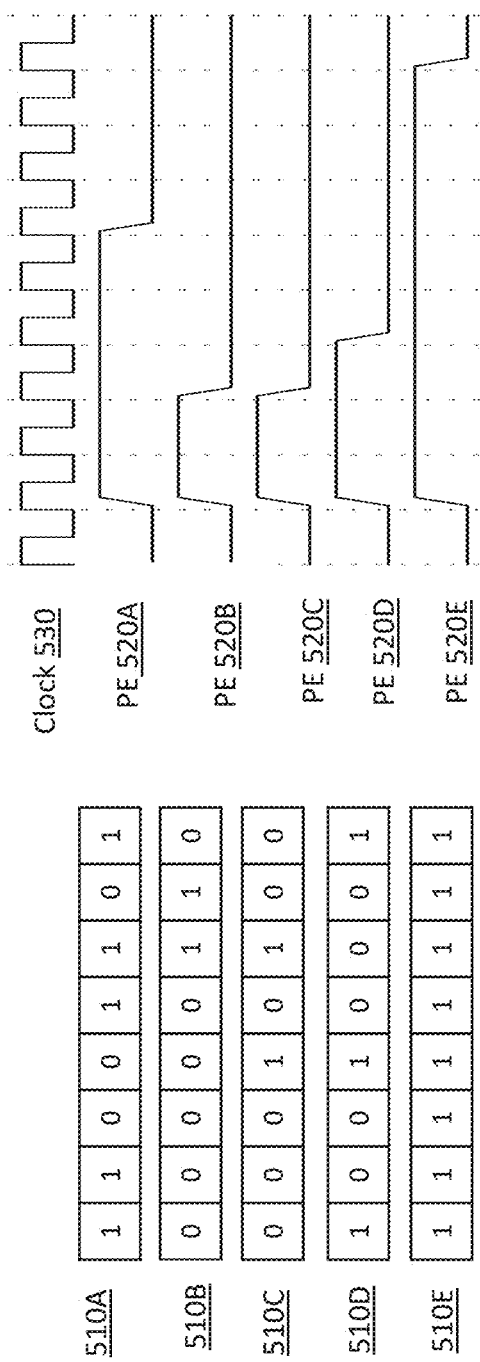
FIG. 5 illustrates PEs having unbalanced workloads, in accordance with various embodiments.

FIG. 5 illustrates PEs 520A-E having unbalanced workloads, in accordance with various embodiments. FIG. 5 shows five bitmaps 510A-E (collectively referred to as "bitmaps 510" or "bitmap 510") for five different weight vectors (not shown in FIG. 5). The weight vectors may be extracted from one single or multiple filters of a DNN layer. The bitmaps 510 are generated based on the weight vectors. In some embodiments, a bitmap 510 may also be generated based on a combination of a weight vector and an activation vector. Each bitmap 510 includes a sequence of bitmap elements having values of 1 and 0. The number of bitmap elements having values of 0 in a bitmap 510 indicates a sparsity level of the corresponding weight vector. As shown in FIG. 5, the bitmap 510E has the lowest sparsity level as all the bitmap elements have values of 1. The bitmap 510 A has three 0 bitmap elements and has the second lowest sparsity level. The bitmap 510D has four 0 bitmap elements and has the third lowest sparsity level. The bitmaps 510B-C have the highest sparsity level, as six of the bitmap elements have values of 0, more than any other bitmaps 510.

The five weight vectors are assigned to five PEs 520A-E (collectively referred to as "PEs 520" or "PE 520") for performing MAC operations. Each PE 520 performs a MAC operation on a different weight vector. The amount of time for a MAC operation correlates to the sparsity level of the corresponding weight vector. Assuming the PEs 520 have the same computational power, it takes a longer time to multiple a weight vector having more non-zero values. As the sparsity of the weight vectors are not balanced (i.e., the sparsity levels are different), the workloads of the PEs 520 are unbalanced.

FIG. 5 includes a clock 530 to show the amount of time each PE 520 takes to perform an MAC operation on the weight vector assigned to the PE. The PE 520A takes five cycles to perform its MAC operation, versus two cycles for the PEs 520B-C, three cycles for the PE 520D, and seven cycles for the PE 520E. The other PEs 520 will be inactive during the time after they finish their MAC operations and before the PE 520E finishes its MAC operation. As the draining operation cannot extract output signals from the PEs 520 until all the PEs 520 finish their MAC operations, the PE 520E becomes the bottleneck in the efficiency of the PEs 520 and slows down the whole MAC operation process of the PEs 510.

Example PEs with Balanced Workloads

Figure 6:
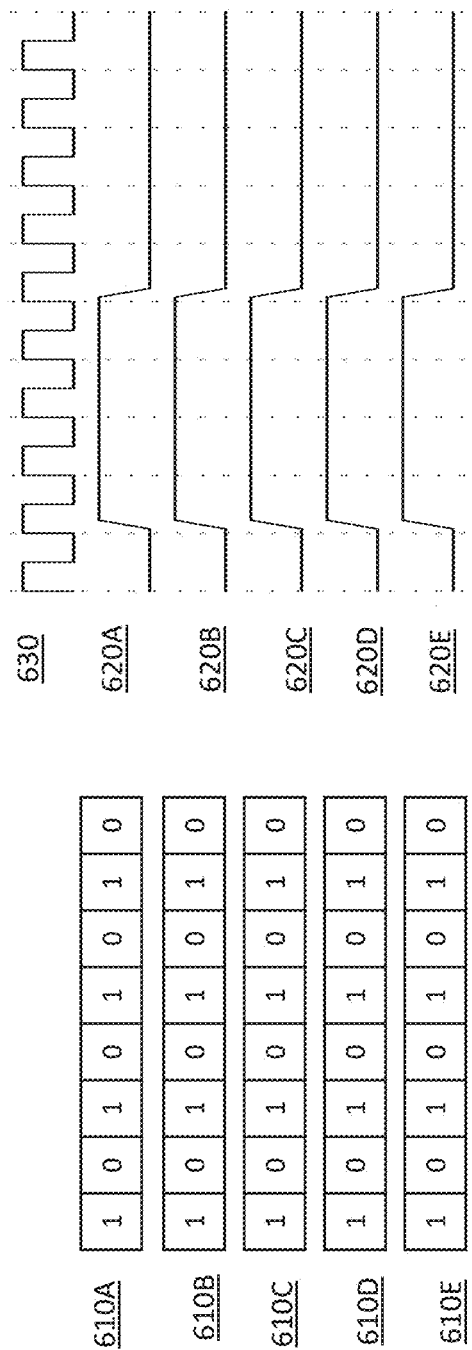
FIG. 6 illustrates PEs having balanced workloads, in accordance with various embodiments.

FIG. 6 illustrates PEs 620A-E having balanced workloads, in accordance with various embodiments. FIG. 6 shows five bitmaps 610A-E (collectively referred to as "bitmaps 610" or "bitmap 610") for five different weight vectors (not shown in FIG. 6). The weight vectors may be extracted from one single or multiple filters of a DNN layer.

The bitmaps 610 are generated based on the weight vectors. In some embodiments, a bitmap 610 may also be generated based on a combination of a weight vector and an activation vector. Each bitmap 610 includes a sequence of bitmap elements having values of 1 and 0. Unlike the bitmaps 510 in FIG. 5 that have different sparsity levels, the bitmaps 610 in FIG. 6 have the same sparsity level. Every bitmap 610 includes three zero elements.

The five weight vectors are assigned to five PEs 620A-E (collectively referred to as "PEs 620" or "PE 620") for performing MAC operations. Each PE 620 performs a MAC operation on a different weight vector. As the weight vectors have the same sparsity level, the PEs 620 have the same workload. Assuming the PEs 620 have the same computational power, the PEs 620 consume the same amount of time to finish their MAC operations. As shown in FIG. 6, each PE 630 takes four cycles indicated by a clock 630 to finish the MAC operation. The draining operation can start at the end of the four cycles. Compared with the embodiment of FIG. 5 where the draining operation cannot start until the end of the six cycles, the MAC operations in FIG. 6 are faster.

The bitmap 610 can be generated by re-arranging the bitmap 510, i.e., by changing indices of some bitmap elements in the sequence. The weight vectors in FIG. 5 can be rearranged based on the rearranged bitmap, i.e., the bitmap 610, to accelerate the INN layer.

Example Process of Rearranging Bitmap

Figure 7:
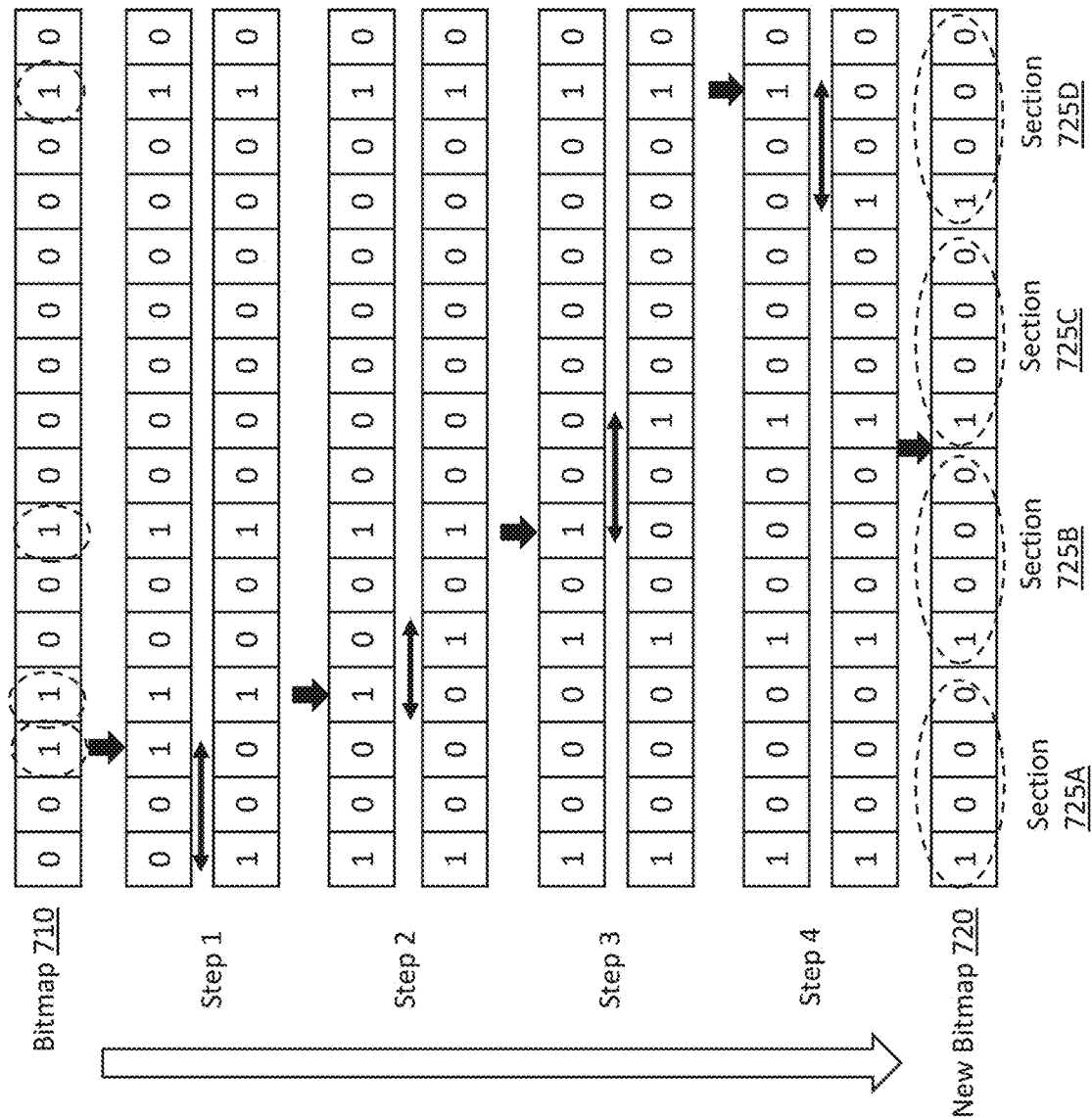
FIG. 7 illustrates a process of balancing sparsity in a weight vector, in accordance with various embodiments.

FIG. 7 illustrates a process of rearranging a weight vector, in accordance with various embodiments. The rearrangement of the weight vector is based on a bitmap 710 of the weight vector. The bitmap 710 may be generated from the weight vector or a combination of the weight vector and an activation vector. For purpose of simplicity and illustration, the bitmap 710 includes 16 elements arranged in a sequence. Each element has a different index in the sequence. In other embodiments, the bitmap 710 may include a different number of elements.

The rearranging process starts with determining how many elements have values of 1 and how many elements have values of 0. In FIG. 7, the bitmap 710 includes four elements have values of 1 and the other 12 elements have values of 0. As the number of elements having values of 1 is smaller than the number of elements having values of 0, the elements having values of 1 will be rearranged to reduce resources required by the rearranging process.

Next, a division operation is performed. The number of all the elements in the bitmap 710, i.e., 16, is divided by the number of elements having values of 1, i.e., 4. The division result is 4 (16/4=4). The division result may not be an integer. In some embodiments, a floor operation can be performed on the divisional result to return the largest integer that is smaller than or equal to the division result. 4 is used as an interval number.

Further, at least some of the elements having values of 1 are repositioned so that there is one element having the value of 1 every 4 (i.e., the interval number) elements. FIG. 7 shows four steps to reposition the elements having values of 1. Step 1 identifies the third element in the sequence as the first element having the value of 1 and moves the third element to the front of the sequence. The element that was at the front of the sequence is moved to the third index in the sequence. In other words, the indices/positions of the two elements are switched.

Similarly, step 2 identifies the fourth element as the second element having the value of 1 and switches the indices of the fourth element with the fifth element so that the difference in the indices of the two neighboring elements both having values of 1 is 4, the interval number. Step 3 identifies the seventh element as the third element having the value of 1 and switches the indices of the seventh element and ninth element. Step 4 identifies the fifteenth element as the fourth element having the value of 1 and switches the indices of the fifteenth element and thirteenth element.

After the four steps, a new bitmap 720 is generated. The new bitmap 720 includes all the 16 elements in the bitmap 710 but the indices of the elements are changed. In the new bitmap 720, there is an element having the value of 1 every four elements. The new bitmap 720 can be used to rearrange the weight vector to generate a new weight vector including the same weights as the original weight vector but the indices of the weights are different. The sparsity in the new weight vector is balanced. The new weight vector may be divided into four sections corresponding to four sections 725A-D of the new bitmap 720. Each section can be sent to a different PE that performs a MAC operation on the section. That way, all the four PEs will have the same workload.

Example DNN Lovers With Rearranged Weight Vectors

Figure 8:
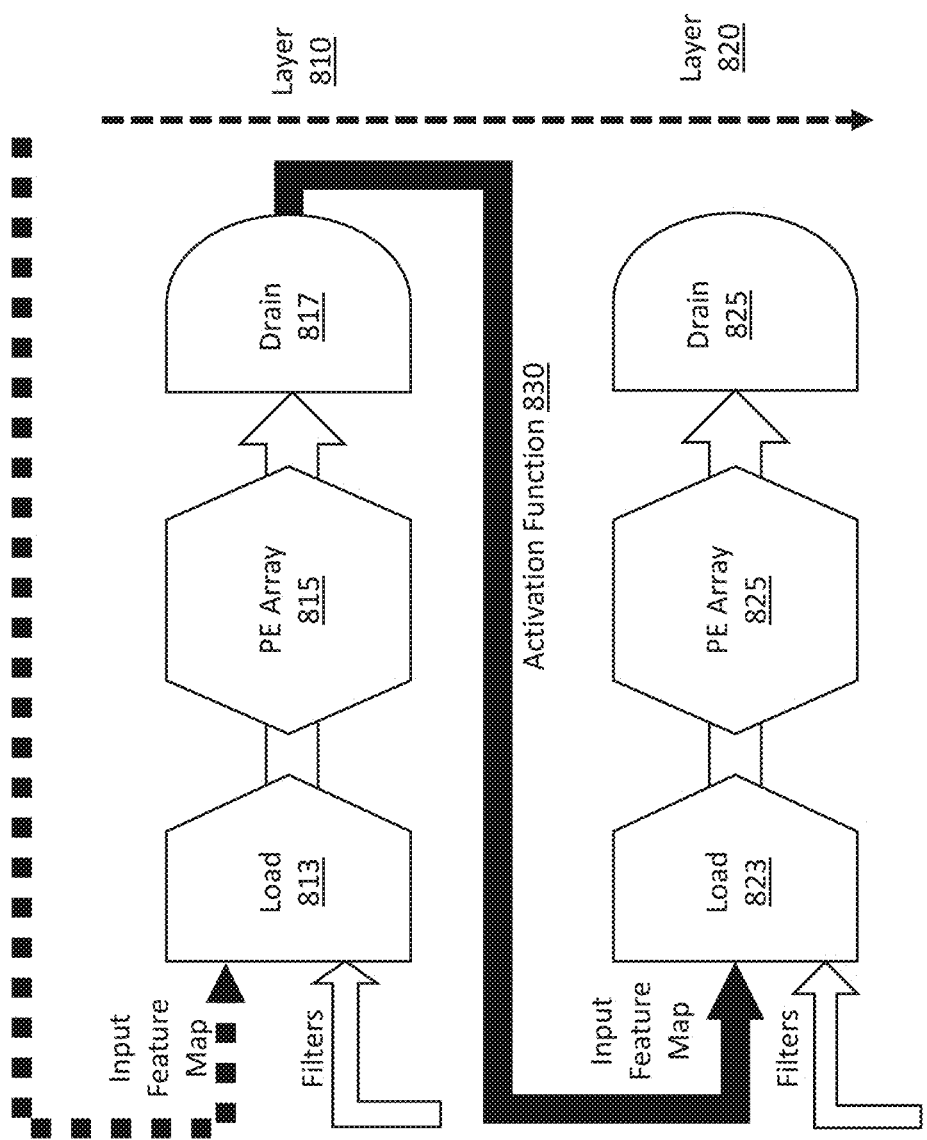
FIG. 8 illustrates two neighboring DNN layers with rearranged weight vectors, in accordance with various embodiments.

FIG. 8 illustrates two neighboring DNN layers 810 and 820 including rearranged weight vectors, in accordance with various embodiments. The layer 810 is adjacent to and precedes the layer 820 in the DNN. The layers 810 and 820 may be convolutional layers in the DNN. An activation function 830 is between the layers 810 and 820. In some embodiments, the activation function 830 may be implemented as part of the layer 820.

The layer 810 includes a load 813, a PE array 815, and a drain 817. The load 813 loads an input feature map and filters of the layer 810 into the PE array 815. The PE array 815 performs MAC operations. An embodiment of the PE array is the PE array 200 in FIG. 3. The drain 817 extracts the output of the PE array 815, which is the output feature map of the layer 810. The output feature map of the layer 810 is transmitted to the layer 820 through the activation 830. The activation function 830 takes in the output feature map of the layer 810 and converts it into the input feature map of the layer 820.

The layer 820 includes a load 823, a PE array 825, and a drain 827. The load 825 load the input feature map and filters of the layer 820 into the PE array 825. PE array 825, an embodiment of which is the PE array 200 in FIG. 2, performs MAC operations on the input feature map, filters, and activation 830. The filters include one or more weight vectors that has been rearranged for balancing sparsity. In some embodiments, all the weights in the filters are rearranged for balancing sparsity. Each filter may be used as a unit in the process of balancing the sparsity. For instance, the weight matrix of the filter is converted to a weight vector, e.g., the weight vector 710. Alternatively, a portion of a filter is used as a unit.

As the order of weights changed, the order of elements in the input feature map may also need to be changed. This is because input feature map and weights come into the DNN layer as a pair so if the indices of the weights are changed, the same change needs to be made to the elements in the input feature map. The change to the order of the elements in the input feature map can be done by the previous layer, i.e., the layer 810, generates the input feature map of the layer 820 in an order that matches the rearranged weight vector. As the ordering of input feature map and output feature map in a DNN layer can be independent and hence, the input feature map and output feature map can be ordered in different ways. This decoupling allows a change to the order of the output feature map of the layer 810 (i.e., the input feature map of the layer 820) to match the rearranged weight vector in the layer 820.

In some embodiments, an activation vector in the activation function 830 is rearranged based on the bitmap of the rearranged weight vector so that the input feature map of the layer 820 generated by the activation function 830 will be consistent with rearranged filters of the layer 820. A weight vector in the filters of the layer 810 may also be rearranged based on the bitmap of the rearranged weight vector to offset the rearrangement of the weight vector of the layer 820. As the weight vector of the layer 810 is rearranged, the output feature map of the layer 810 and the input feature map of the layer 820 will be rearranged accordingly. Therefore, during the MAC operations of the PE array 815, the impact of the rearrangement on the output feature map of the layer 820 will be eliminated so that the output feature map of the layer 820 will still be compatible with MAC operations in the next layer, i.e., the layer following the layer 820. In embodiments where the layer 810 is the first layer of the DNN, the weight and activations can be rearranged offline, e.g., by a compiler, before loaded into the PE array 815.

Example Sparsity Balancing System

Figure 9:
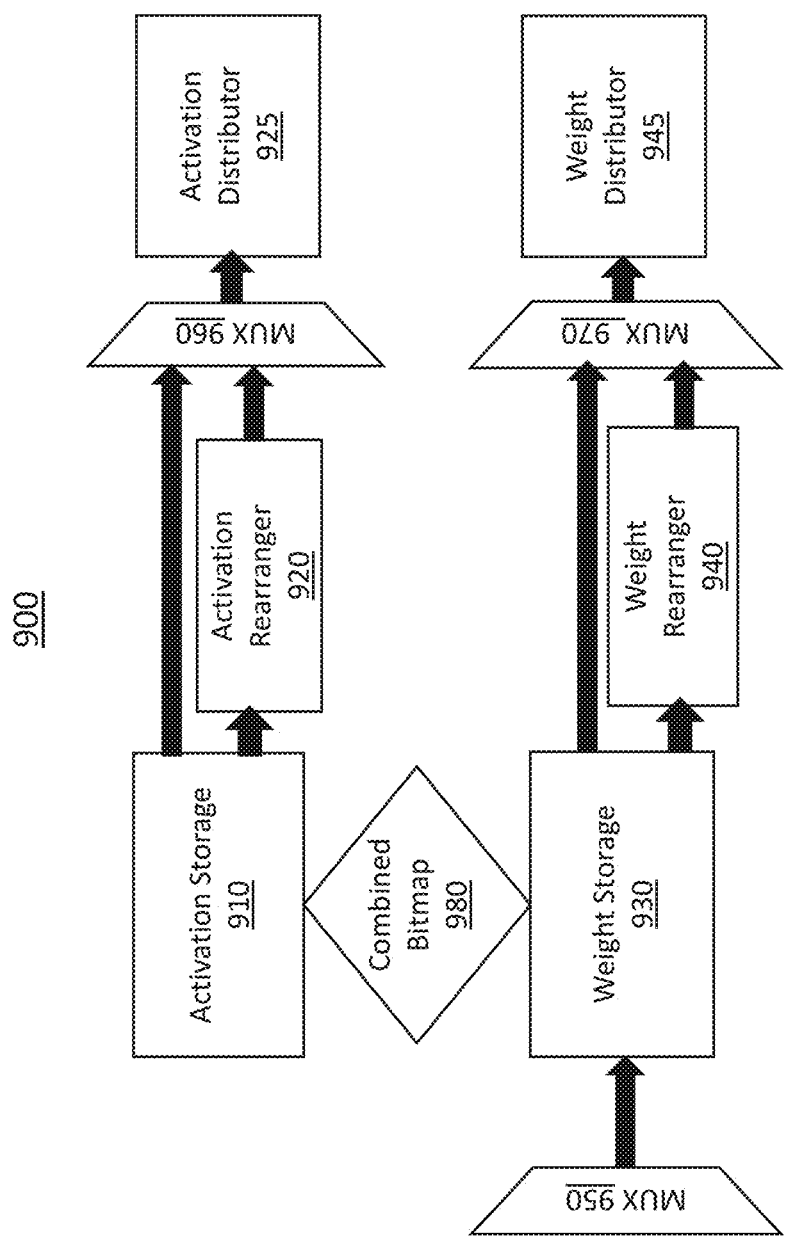
FIG. 9 illustrates an architecture of a sparsity balancing system for combined sparsity balancing, in accordance with various embodiments.

FIG. 9 illustrates an architecture of a sparsity balancing system 900 for combined sparsity balancing, in accordance with various embodiments. Combined sparsity balancing includes balancing sparsity in weight and balancing sparsity in activation. The sparsity balancing system 900 balances sparsity in both weights and activation based on a combined bitmap 980. The combined bitmap 980 is generated based on both weights and activation. An embodiment of the combined bitmap is the bitmap 410 in FIG. 4. The sparsity balancing system 900 includes an activation storage 910, an activation rearranger 920, an activation distributer 925, a weight storage 930, a weight rearranger 940, a weight distributer 945, and multiplexers (MUXs) 950, 960, and 970. In other embodiments, the sparsity balancing system 900 may include fewer, more, or different components. The sparsity balancing system 900 may be implemented in a DNN layer before the PE array in the layer.

The activation storage 910 stores output feature map received from the previous layer and an activation function. The activation rearranger 920 rearranges an activation vector of the activation function based on the combined bitmap 980 to balance sparsity in the activation vector. The rearranged activation vector has better balanced sparsity than the original activation vector. The MUX 960 receives the rearranged activation vector from the activation rearranger and one or more other activation vectors from the activation storage. The other activation vectors are not rearranged. The MUX 960 is a combinational logic circuit designed to switch one of several input lines through to a single common output line by the application of a control signal. The MUX 960 combines the rearranged activation vector and the other activation vectors, e.g., into a combined activation vector. The combined activation vector has the better-balanced sparsity of the rearranged activation vector. The combined activation vector is sent to the activation distributor 925. The activation distributer 925 distributes the combined activation vector to PEs. For instance, the activation distributer 925 divides the combined activation vector into sections and sends each section to a different PE. As the combined activation vector has the better-balanced sparsity, the different PEs will have better-balanced workloads, which can accelerate the deep learning process.

The MUX 950 receives an original weight vector (i.e., a weight vector that has not been rearranged) and a rearranged weight vector (i.e., a weight vector that has been rearranged, e.g., by software). The rearranged weight vector has better balanced sparsity than the original weight vector. The MUX 950 combines the two weight vectors into one weight vector. The weight vector output from the MUX 950 is stored in the weight storage 930.

The weight rearranger 940 rearranges a weight vector stored in the weight storage 930, e.g., based on the combined bitmap 980, which further improves the sparsity balance in the weight vector. This rearranged weight vector and another weight vector stored in the weight storage 930 but not rearranged by the weight rearranger 940 are input into the MUX 970. The MUX 970 combines the two weight vectors into a combined weight vector. The combined weight vector is transmitted to the weight distributer 945. The weight distributer 945 distributes the combined weight vector to PEs. For instance, the weight distributer 945 divides the combined weight vector into sections and sends each section to a different PE. As the combined weight vector has improved sparsity balance, the different PEs will have better-balanced workloads, which accelerates the deep learning process.

Example DL Environment

Figure 10:
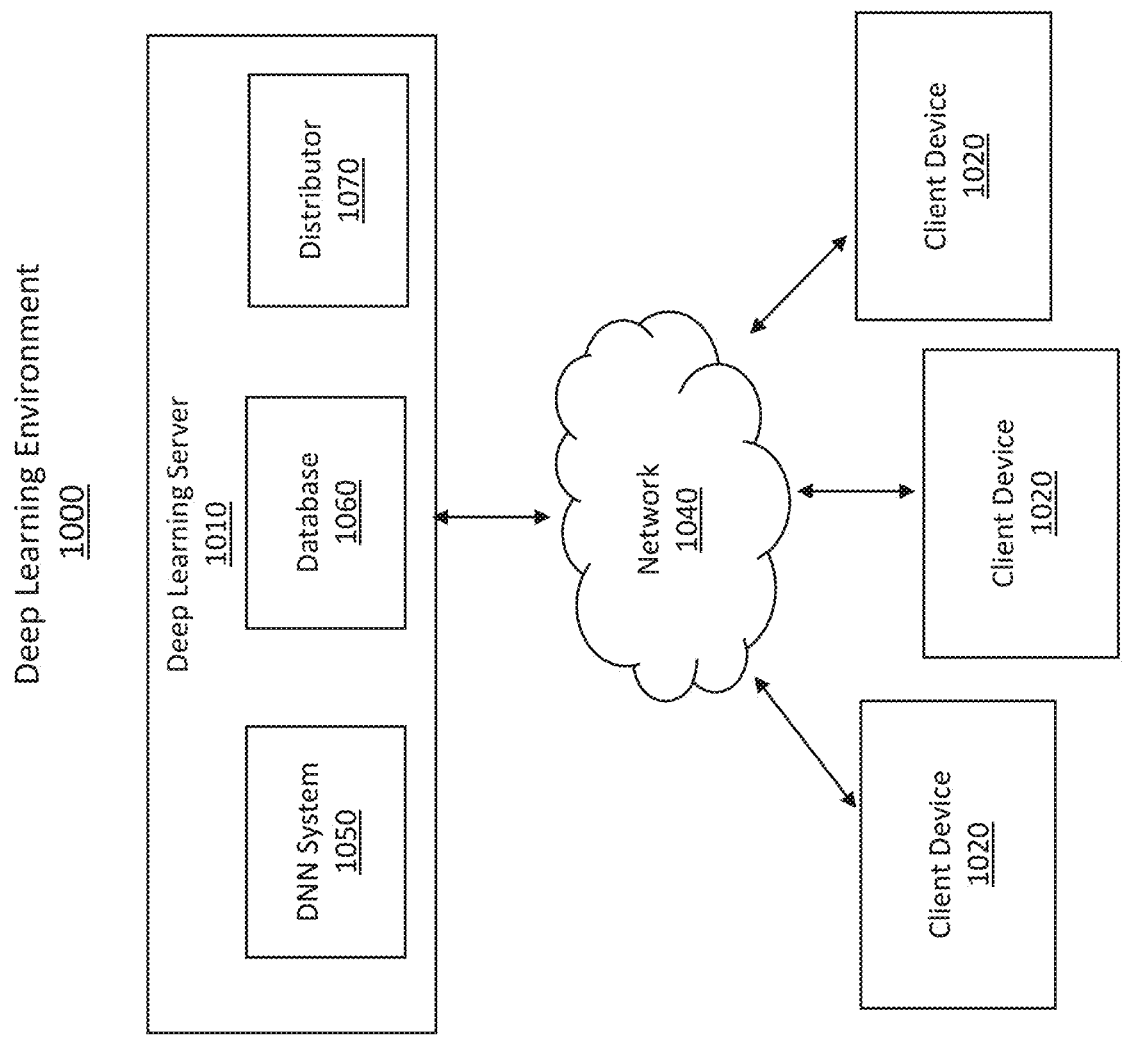
FIG. 10 illustrates a deep learning environment, in accordance with various embodiments.

FIG. 10 illustrates a DL environment 1000, in accordance with various embodiments. The DL environment 1000 includes a DL server 1010 and a plurality of client devices 1020 (individually referred to as client device 1020). The DL server 1010 is connected to the client devices 1020 through a network 1040. In other embodiments, the DL environment 1000 may include fewer, more, or different components.

The DL server 1010 trains DL models using neural networks. A neural network is structured like the human brain and consists of artificial neurons, also known as nodes. These nodes are stacked next to each other in three types of layers: input layer, hidden layer(s), and output layer. Data provides each node with information in the form of inputs. The node multiplies the inputs with random weights, calculates them, and adds a bias. Finally, nonlinear functions, also known as activation functions, are applied to determine which neuron to fire. The DL server 1010 can use various types of neural networks, such as DNN, recurrent neural network (RNN), generative adversarial network (GAN), long short term memory network (LSTMN), and so on. During the process of training the DL models, the neural networks use unknown elements in the input distribution to extract features, group objects, and discover useful data patterns. The DL models can be used to solve various problems, e.g., making predictions, classifying images, and so on. The DL server 1010 may build DL models specific to particular types of problems that need to be solved. A DL model is trained to receive an input and outputs the solution to the particular problem.

In FIG. 10, the DL server 1010 includes a DNN system 1050, a database 1060, and a distributer 1070. The DNN system 1050 trains DNNs. The DNNs can be used to process images, e.g., images captured by autonomous vehicles, medical devices, satellites, and so on. In an embodiment, a DNN receives an input image and outputs classifications of objects in the input image. An example of the DNNs is the DNN 100 described above in conjunction with FIG. 1. The DNN system 1050 also compresses the trained DNNs to reduce the sizes of the trained DNNs. As the compressed DNNs has a smaller size, application of the compressed DNNs requires less time and computing resources (e.g., memory, processor, etc.) compared with uncompressed DNNs. The compressed DNNs may be used on low memory sparsity balancing systems, like mobile phones, IOT edge devices, and so on. The DNN system 1050 can also rearrange weight vectors and activation vectors in a trained or compressed DNN to balance sparsity in the weight vectors and activation vectors. More details regarding the DNN system 1050 are described below in conjunction with FIG. 11.

The database 1060 stores data received, used, generated, or otherwise associated with the DL server 1010. For example, the database 1060 stores a training dataset that the DNN system 1050 uses to train DNNs. In an embodiment, the training dataset is an image gallery that can be used to train a DNN for classifying images. The training dataset may include data received from the client devices 1020. As another example, the database 1060 stores hyperparameters of the neural networks built by the DL server 1010.

The distributer 1070 distributes DL models generated by the DL server 1010 to the client devices 1020. In some embodiments, the distributer 1070 receives a request for a DNN from a client device 1020 through the network 1040. The request may include a description of a problem that the client device 1020 needs to solve. The request may also include information of the client device 1020, such as information describing available computing resource on the client device. The information describing available computing resource on the client device 1020 can be information indicating network bandwidth, information indicating available memory size, information indicating processing power of the client device 1020, and so on. In an embodiment, the distributer may instruct the DNN system 1050 to generate a DNN in accordance with the request. The DNN system 1050 may generate a DNN based on the description of the problem. Alternatively or additionally, the DNN system 1050 may compress a DNN based on the information describing available computing resource on the client device.

In another embodiment, the distributer 1070 may select the DNN from a group of pre-existing DNNs based on the request. The distributer 1070 may select a DNN for a particular client device 1030 based on the size of the DNN and available resources of the client device 1030. In embodiments where the distributer 1070 determines that the client device 1030 has limited memory or processing power, the distributer 1070 may select a compressed DNN for the client device 1030, as opposed to an uncompressed DNN that has a larger size. The distributer 1070 then transmits the DNN generated or selected for the client device 1020 to the client device 1020.

In some embodiments, the distributer 1070 may receive feedback from the client device 1020. For example, the distributer 1070 receives new training data from the client device 1020 and may send the new training data to the DNN system 1050 for further training the DNN. As another example, the feedback includes an update of the available computer resource on the client device 1020. The distributer 1070 may send a different DNN to the client device 1020 based on the update. For instance, after receiving the feedback indicating that the computing resources of the client device 1020 have been reduced, the distributer 1070 sends a DNN of a smaller size to the client device 1020.

The client devices 1020 receive DNNs from the distributer 1070 and applies the DNNs to solve problems, e.g., to classify objects in images. In various embodiments, the client devices 1020 input images into the DNNs and uses the output of the DNNs for various applications, e.g., visual reconstruction, augmented reality, robot localization and navigation, medical diagnosis, weather prediction, and so on. A client device 1020 may be one or more computing devices capable of receiving user input as well as transmitting and/or receiving data via the network 1040. In one embodiment, a client device 1020 is a conventional computer sparsity balancing system, such as a desktop or a laptop computer. Alternatively, a client device 1020 may be a device having computer functionality, such as a personal digital assistant (PDA), a mobile telephone, a smartphone, an autonomous vehicle, or another suitable device. A client device 1020 is configured to communicate via the network 1040. In one embodiment, a client device 1020 executes an application allowing a user of the client device 1020 to interact with the DL server 1010 (e.g., the distributer 1070 of the DL server 1010). The client device 1020 may request DNNs or send feedback to the distributer 1070 through the application. For example, a client device 1020 executes a browser application to enable interaction between the client device 1020 and the DL server 1010 via the network 1040. In another embodiment, a client device 1020 interacts with the DL server 1010 through an application programming interface (API) running on a native operating sparsity balancing system of the client device 1020, such as IOS® or ANDROID™.

In an embodiment, a client device 1020 is an integrated computing device that operates as a standalone network-enabled device. For example, the client device 1020 includes display, speakers, microphone, camera, and input device. In another embodiment, a client device 1020 is a computing device for coupling to an external media device such as a television or other external display and/or audio output sparsity balancing system. In this embodiment, the client device 1020 may couple to the external media device via a wireless interface or wired interface (e.g., an HDMI cable) and may utilize various functions of the external media device such as its display, speakers, microphone, camera, and input devices. Here, the client device 1020 may be configured to be compatible with a generic external media device that does not have specialized software, firmware, or hardware specifically for interacting with the client device 1020.

The network 1040 supports communications between the DL server 1010 and client devices 1020. The network 1040 may comprise any combination of local area and/or wide area networks, using both wired and/or wireless communication sparsity balancing systems. In one embodiment, the network 1040 may use standard communications technologies and/or protocols. For example, the network 1040 may include communication links using technologies such as Ethernet, 8010.11, worldwide interoperability for microwave access (WiMAX), 3G, 4G, code division multiple access (COMA), digital subscriber line (DSL), etc. Examples of networking protocols used for communicating via the network 1040 may include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 1040 may be represented using any suitable format, such as hypertext markup language (HTML) or extensible markup language (XML). In some embodiments, all or some of the communication links of the network 1040 may be encrypted using any suitable technique or techniques.

Example DNN System

Figure 11:
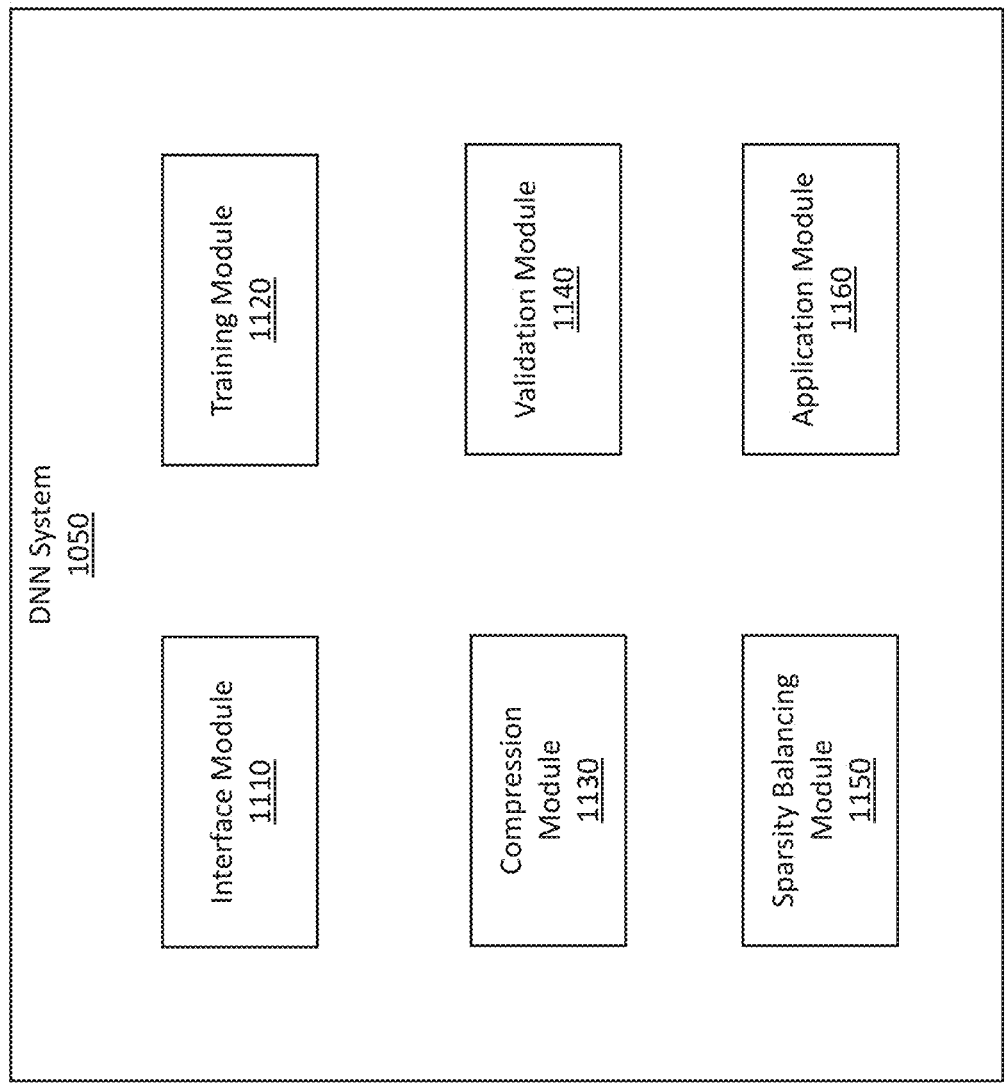
FIG. 11 is a block diagram of a DNN system, in accordance with various embodiments.

FIG. 11 is a block diagram of the DNN system 1050, in accordance with various embodiments. The DNN system 1050 trains DNNs. The DNN system 1050 can train DNNs that can be used to solve various problems, such as image classification, learning relationships between biological cells (e.g., DNA, proteins, etc.), control behaviors for devices (e.g., robots, machines, etc.), and so on. The DNN system 1050 includes an interface module 1110, a training module 1120, a compression module 1130, a validation module 1140, a sparsity balancing module 1150, and an application module 1160. In other embodiments, alternative configurations, different or additional components may be included in the DNN system 1050. Further, functionality attributed to a component of the DNN system 1050 may be accomplished by a different component included in the DNN system 1050 or a different sparsity balancing system.

The interface module 1110 facilitates communications of the DNN system 1050 with other systems. For example, the interface module 1110 establishes communications between the DNN system 1050 with an external database to receive data that can be used to train DNNs or input into DNNs to perform tasks. As another example, the interface module 1110 supports the DNN system 1050 to distribute DNNs to other systems, e.g., computing devices configured to apply DNNs to perform tasks.

The training module 1120 trains DNNs by using a training dataset. The training module 1120 forms the training dataset. In an embodiment where the training module 1120 trains a DNN to recognize objects in images, the training dataset includes training images and training labels. The training labels describe ground-truth classifications of objects in the training images. In some embodiments, each label in the training dataset corresponds to an object in a training image. In some embodiments, a part of the training dataset may be used to initially train the DNN, and the rest of the training dataset may be held back as a tuning subset used by the compression module 1130 to tune a compressed DNN or as a validation subset used by the validation module 1140 to validate performance of a trained or compressed DNN. The portion of the training dataset not including the tuning subset and the validation subset may be used to train the DNN.

The training module 1120 also determines hyperparameters for training the DNN. Hyperparameters are variables specifying the DNN training process. Hyperparameters are different from parameters inside the DNN (e.g., weights of filters). In some embodiments, hyperparameters include variables determining the architecture of the DNN, such as number of hidden layers, etc. Hyperparameters also include variables which determine how the DNN is trained, such as batch size, number of epochs, etc. A batch size defines the number of training samples to work through before updating the parameters of the DNN. The batch size is the same as or smaller than the number of samples in the training dataset. The training dataset can be divided into one or more batches. The number of epochs defines how many times the entire training dataset is passed forward and backwards through the entire network. The number of epochs defines the number of times that the deep learning algorithm works through the entire training dataset. One epoch means that each training sample in the training dataset has had an opportunity to update the parameters inside the DNN. An epoch may include one or more batches. The number of epochs may be 10, 100, 500, 1000, or even larger.

The training module 1120 defines the architecture of the DNN, e.g., based on some of the hyperparameters. The architecture of the DNN includes an input layer, an output layer, and a plurality of hidden layers. The input layer of a DNN may include tensors (e.g., a multidimensional array) specifying attributes of the input image, such as the height of the input image, the width of the input image, and the depth of the input image (e.g., the number of bits specifying the color of a pixel in the input image). The output layer includes labels of objects in the input layer. The hidden layers are layers between the input layer and output layer. The hidden layers include one or more convolutional layers and one or more other types of layers, such as rectified liner unit (ReLU) layers, pooling layers, fully connected layers, normalization layers, softmax or logistic layers, and so on. The convolutional layers of the DNN abstract the input image to a feature map that is represented by a tensor specifying the feature map height, the feature map width, and the feature map channels (e.g., red, green, blue images include three channels). A pooling layer is used to reduce the spatial volume of input image after convolution. It is used between two convolution layers. A fully connected layer involves weights, biases, and neurons. It connects neurons in one layer to neurons in another layer. It is used to classify images between different category by training.

The training module 1120 inputs the training dataset into the DNN and modifies the parameters inside the DNN to minimize the error between the generated labels of objects in the training images and the training labels. The parameters include weights of filters in the convolutional layers of the DNN. In some embodiments, the training module 210 uses a cost function to minimize the error. After the training module 1120 finishes the predetermined number of epochs, the training module 1120 may stop updating the parameters in the DNN. The DNN having the updated parameters is referred to as a trained DNN.

The compression module 1130 compresses trained DNNs to reduce complexity of the trained DNNs at the cost of small loss in model accuracy. The compression module 1130 converts some or all of the convolutional tensors in a trained DNN into reduced tensors that have reduced dimensions from the corresponding convolutional tensors. The compression module 1130 then integrates the reduced tensors into the trained DNN to reduce the complexity of the trained DNN. In some embodiments, the compression module 1130 prunes a subset of the filters in a convolutional layer to generate a sparse tensor and then decomposes the sparse tensor to generate the reduced tensor of the convolutional layer. The compression module 1130 compresses the trained DNN by removing the convolutional tensor from the network and placing the reduced tensor into the network. After some or all of the convolutional tensor in the trained DNN is removed and their reduced tensors are integrated, a compressed DNN is generated. The compression module 1130 may fine-tune the compressed DNN. For instance, the compression module 1130 uses the training dataset, or a subset of the training dataset, to train the compressed DNN. As the compressed DNN is converted from the pre-trained DNN, the fine-tuning process is a re-training process.

The validation module 1140 verifies accuracy of trained or compressed DNN. In some embodiments, the validation module 1140 inputs samples in a validation dataset into the DNN and uses the outputs of the DNN to determine the model accuracy. In some embodiments, a validation dataset may be formed of some or all the samples in the training dataset. Additionally or alternatively, the validation dataset includes additional samples, other than those in the training sets. In some embodiments, the validation module 1140 determines may determine an accuracy score measuring the precision, recall, or a combination of precision and recall of the DNN. The validation module 1140 may use the following metrics to determine the accuracy score: Precision=TP (TP+FP) and Recall=TP (TP+FN), where precision may be how many the reference classification model correctly predicted (TP or true positives) out of the total it predicted (TP+FP or false positives), and recall may be how many the reference classification model correctly predicted (TP) out of the total number of objects that did have the property in question (TP+FN or false negatives). The F-score (F-score=2*PR/(P+R)) unifies precision and recall into a single measure.

The validation module 1140 may compare the accuracy score with a threshold score. In an example where the validation module 1140 determines that the accuracy score of the augmented model is lower than the threshold score, the validation module 1140 instructs the training module 1120 or the compression module 1130 to re-train the DNN. In one embodiment, the training module 1120 or the compression module 1130 may iteratively re-train the DNN until the occurrence of a stopping condition, such as the accuracy measurement indication that the DNN may be sufficiently accurate, or a number of training rounds having taken place.

In some embodiments, the validation module 1140 instructs the compression module 1130 to compress DNNs. For example, the validation module 1140 may determine whether an accuracy score of a compressed DNN is above a threshold score. In response to determining that the accuracy score of a compressed DNN is above a threshold score, the validation module 1140 instructs the compression module 1130 to further compress the DNN, e.g., by compressing an uncompressed convolutional layer in the DNN. In an embodiment, the validation module 1140 may determine a compression rate based on the accuracy score and instructs the compression module 1130 to further compress the DNN based on the compression rate. The compression rate, e.g., is a percentage indicating the reduced size of the DNN from compression.

The sparsity balancing module 1150 balances sparsity in filters of DNN layers. An embodiment of the sparsity balancing module 1150 is the sparsity balancing system 900 in FIG. 9. In some embodiments, the sparsity balancing module 1150 accesses a weight vector of a layer in a sequence of layers in the DNN. The weight vector includes a first sequence of weights. The weights have different values. For instance, some of the weights have non-zero values but some of the weights have zero values. In an embodiment, the weight vector represents a filter in the layer. The filter may be a matrix of weights that includes X rows and Y columns, where X and Y are integers. The weight vector may include Y sections, each section is a row in the matrix. For instance, the first row is the first section in the weight vector, the second row is the second section in the weight vector, and so on. In other embodiments, the weight vector may represent a portion of the filter or represent multiple filters of the layer. The layer may also include an activation. The activation can be represented by an activation vector that includes a sequence of activations.

The sparsity balancing module 1150 generates a bitmap based at least on the weight vector. The bitmap includes a second sequence of bitmap elements. Each of the bitmap elements in the second sequence corresponds to a different weight in the first sequence. A value of a bitmap element is determined based at least on a value of the corresponding weight. Also, an index of the bitmap element in the second sequence matches an index of the corresponding weight in the first sequence. For instance, for each weight having a non-zero value, the sparsity balancing module 1150 generates a one valued bitmap element. For each weight having a zero value, the sparsity balancing module 1150 generates a zero valued bitmap element.

In some embodiments, the sparsity balancing module 1150 generates the bitmap using both the weight vector and the activation vector. The sparsity balancing module 1150 generates a weight bitmap based on the weight vector. The weight bitmap includes a sequence of weight bitmap elements. The sparsity balancing module 1150 generates an activation bitmap based on the activation vector. The activation bitmap includes a sequence of activation bitmap elements. Each respective bitmap element in the bitmap corresponds to a different weight bitmap element in the weight bitmap and a different activation bitmap element in the activation bitmap. A bitmap element has a value equal to a product of a value of the corresponding weight bitmap element and a value of the corresponding activation bitmap element. In an embodiment where the weight bitmap element has a value of one but the activation bitmap element has a value of zero, the bitmap element has a value of zero.

The sparsity balancing module 1150 generates a new bitmap from the bitmap by rearranging the bitmap elements in the second sequence based on the values of the bitmap elements. The sparsity balancing module 1150 switches an index of a one valued bitmap element and an index of a zero valued bitmap element. In some embodiments, the sparsity balancing module 1150 determines a first number of the one valued bitmap elements. The sparsity balancing module 1150 also determines a second number of the zero valued bitmap elements. The sparsity balancing module 1150 determines a sum of the two number and identifies the smaller number between the two numbers. In an example where the first number is smaller than the second number (i.e., there are more bitmap elements having values of one than bitmap elements having values of zero), the sparsity balancing module 1150 divides the sum with the first number. The sparsity balancing module 1150 may also performs a floor operation to determine the largest integer that is smaller than or equal to the result of the division. The integer retuned by the floor operation is used as an interval number. The sparsity balancing module 1150 rearranges the bitmap elements in the second sequence so that every interval number of bitmap elements in the new bitmap includes at least one bitmap element having a value of one. In another example where the second number is smaller than the first number, the sparsity balancing module 1150 divides the sum with the second number and rearrange the bitmap elements in the second sequence so that every interval number of bitmap elements in the new bitmap includes at least one bitmap element having a value of zero.

The sparsity balancing module 1150 then assigns the weight vector to processing elements in a network of the DNN based on the new bitmap. Each processing element is configured to use a different subset of the weight vector to perform a multiply-accumulate operation. The sparsity balancing module 1150 may rearrange the weights in the weight vector based on the new bitmap. For instance, the sparsity balancing module 1150 moves a weight based on the index of the bitmap element corresponding to the weight in the new bitmap. The sparsity balancing module 1150 divides the rearranged weight vector to subsets based on the interval number. Each subset may include at least the interval number of bitmap elements. As the bitmap elements having the value of one represents non-zero valued weights, the numbers of non-zero valued weights in the subsets are the same or similar. Accordingly, the workloads of the PEs are the same or similar.

The sparsity balancing module 1150 may also rearrange the activation vector based on the new bitmap so that the order of the activations will be consistent with the new order of the weights. In some embodiments, the sparsity balancing module 1150 also rearranges the weight vector of a preceding layer, i.e., a different layer that precedes the layer in the DNN, to offset the rearrangement of the weight vector of the layer. As the weight vector of a preceding layer is rearranged, the output of the preceding layer, which is the input to the layer, will be changed. The changed input to the layer offsets the rearrangement of the weight vector in the layer so that the output of the layer can still be used as an input to the next layer in the DNN without changing the next layer.

The application module 1160 applies the trained or compressed DNN to perform tasks. For instance, the application module 1160 inputs images into the DNN. The DNN outputs classifications of objects in the images. As an example, the DNN may be provisioned in a security setting to detect malicious or hazardous objects in images captured by security cameras. As another example, the DNN may be provisioned to detect objects (e.g., road signs, hazards, humans, pets, etc.) in images captured by cameras of an autonomous vehicle. The input to the DNN may be formatted according to a predefined input structure mirroring the way that the training dataset was provided to the DNN. The DNN may generate an output structure which may be, for example, a classification of the image, a listing of detected objects, a boundary of detected objects, or the like. In some embodiments, the application module 1160 distributes the DNN to other sparsity balancing systems, e.g., computing devices in communication with the DNN system 1050, for the other sparsity balancing systems to apply the DNN to perform the tasks.

Example Method of Balancing Sparsity

Figure 12:
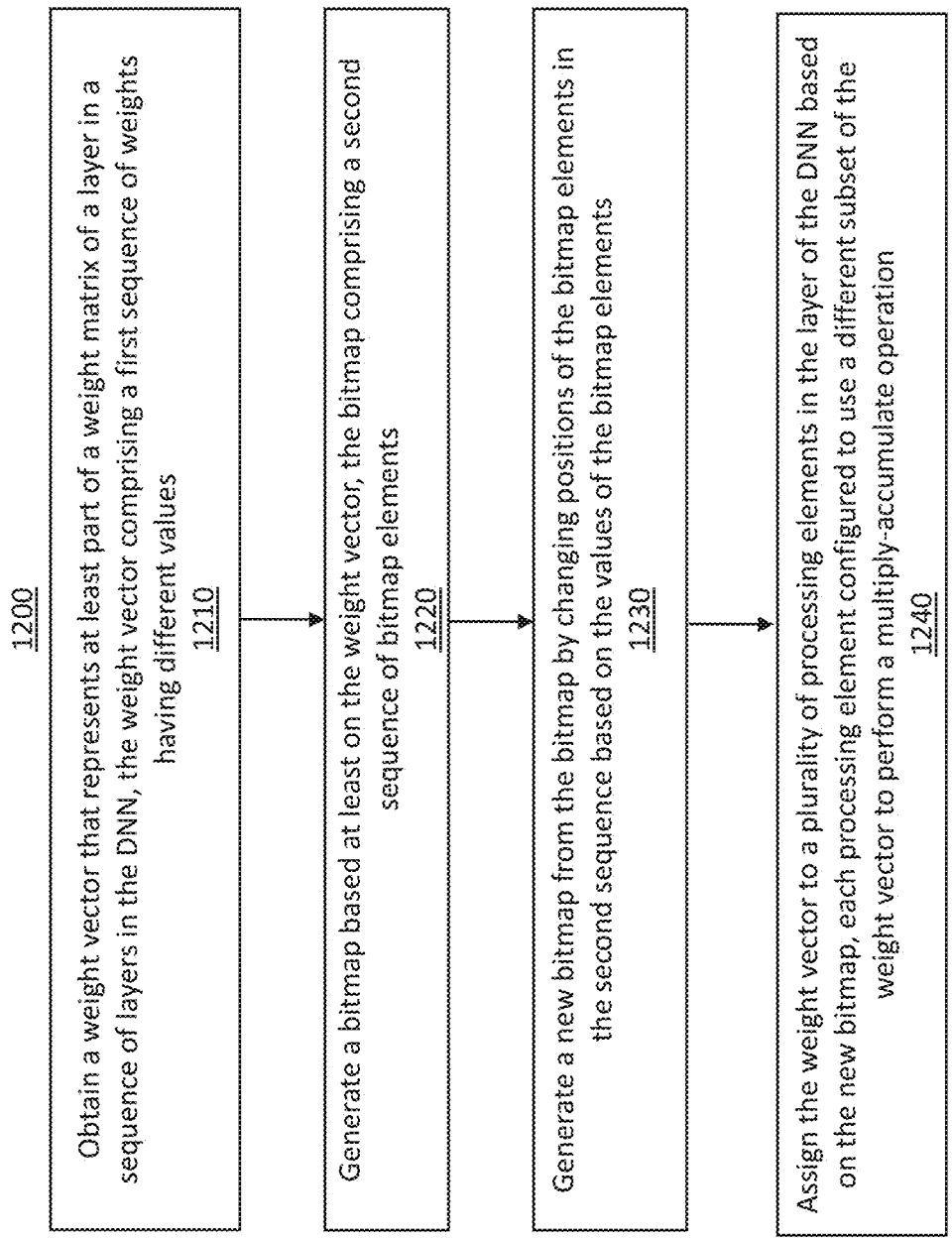
FIG. 12 is a flowchart showing a method of balancing sparsity in a weight vector, in accordance with various embodiments.

FIG. 12 is a flowchart showing a method 1200 for balancing sparsity in a weight vector, in accordance with various embodiments. The method 1200 may be performed by the sparsity balancing module 1150 in FIG. 11. Although the method 1200 is described with reference to the flowchart illustrated in FIG. 12, many other methods for sparsity balancing may alternatively be used. For example, the order of execution of the steps in FIG. 12 may be changed. As another example, some of the steps may be changed, eliminated, or combined.

The sparsity balancing module 1150 obtains 1210 a weight vector that represents at least part of a weight matrix of a layer in a sequence of layers in the DNN. In some embodiments, the weight vector is a vector in the weight matrix of a DNN layer or a combination of multiple vectors in the weight matrix. The weight matrix may be a portion of or a whole filter in the DNN layer. The weight vector includes a first sequence of weights. The weights have different values.

The sparsity balancing module 1150 generates 1220 a bitmap based at least on the weight vector. The bitmap includes a second sequence of bitmap elements. Each of the bitmap elements in the second sequence corresponds to a different weight in the first sequence. A value of a bitmap element is determined based at least on a value of the corresponding weight. Also, an index of the bitmap element in the second sequence matches an index of the corresponding weight in the first sequence. For instance, for each weight having a non-zero value, the sparsity balancing module 1150 generates bitmap element having a value of one versus a bitmap element having a value of zero for a zero valued weight. In some embodiments, the sparsity balancing module 1150 generates the bitmap using both the weight vector and the activation vector.

The sparsity balancing module 1150 generates 1230 a new bitmap from the bitmap by rearranging the bitmap elements in the second sequence based on the values of the bitmap elements. The sparsity balancing module 1150 reorders the bit elements in the bitmap to get a balanced sparsity, i.e., an even (or almost event) distribution of zero valued bit elements in the bitmap. The sparsity balancing module 1150 may rearrange the bitmap by using the process shown in FIG. 7.

The sparsity balancing module 1150 then assigns 1240 the weight vector to a plurality of processing elements in the layer of the DNN based on the new bitmap. Each processing element is configured to use a different subset of the weight vector to perform a multiply-accumulate operation. The sparsity balancing module 1150 can rearrange the weight vector based on the order of the bitmaps in the new bitmap. For instance, the sparsity balancing module 1150 moves a weight based on the index of the bitmap element corresponding to the weight in the new bitmap. As the new bitmap has a balanced sparsity, the rearrange weight vector will also have the balanced sparsity.

The sparsity balancing module 1150 may also rearrange the activation vector based on the new bitmap. In some embodiments, the sparsity balancing module 1150 also rearranges the weight vector of a preceding layer, i.e., a different layer that precedes the layer in the DNN, to offset the rearrangement of the weight vector of the layer. As the weight vector of a preceding layer is rearranged, the output of the preceding layer, which is the input to the layer, will be changed. The changed input to the layer offsets the rearrangement of the weight vector in the layer so that the output of the layer can still be used as an input to the next layer in the DNN without changing the next layer.

Example Computing Device

Figure 13:
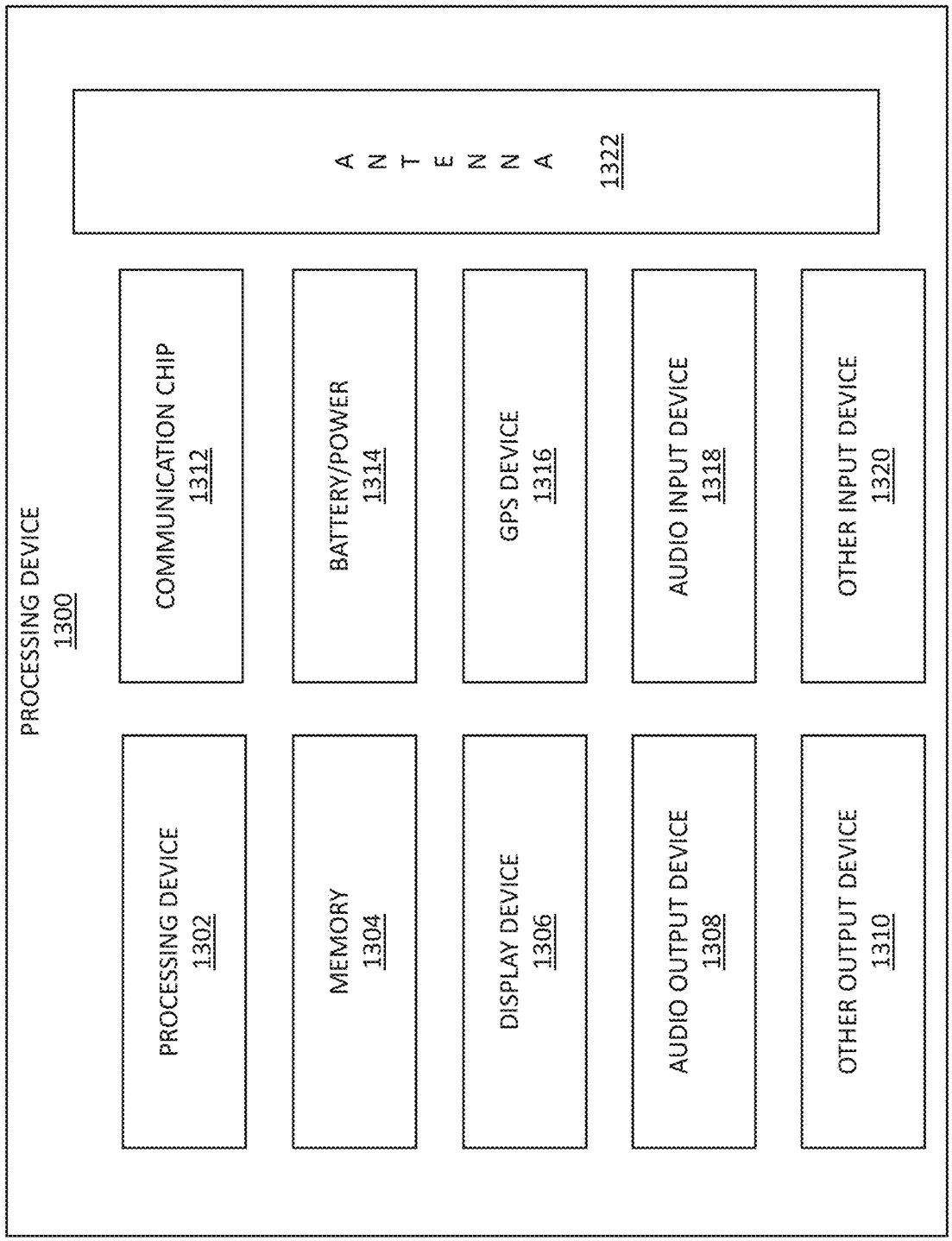
FIG. 13 is a block diagram of an example computing device, in accordance with various embodiments.

FIG. 13 is a block diagram of an example computing sparsity balancing system for use as the DNN system 1050, in accordance with various embodiments. A number of components are illustrated in FIG. 13 as included in the computing sparsity balancing system 1300, but any one or more of these components may be omitted or duplicated, as suitable for the application. In some embodiments, some or all of the components included in the computing sparsity balancing system 1300 may be attached to one or more motherboards. In some embodiments, some or all of these components are fabricated onto a single sparsity balancing system on a chip (SoC) die. Additionally, in various embodiments, the computing sparsity balancing system 1300 may not include one or more of the components illustrated in FIG. 13, but the computing sparsity balancing system 1300 may include interface circuitry for coupling to the one or more components. For example, the computing sparsity balancing system 1300 may not include a display device 1306, but may include display device interface circuitry (e.g., a connector and driver circuitry) to which a display device 1306 may be coupled. In another set of examples, the computing sparsity balancing system 1300 may not include an audio input device 1318 or an audio output device 1308, but may include audio input or output device interface circuitry (e.g., connectors and supporting circuitry) to which an audio input device 1318 or audio output device 1308 may be coupled.

The computing sparsity balancing system 1300 may include a processing device 1302 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1302 may include one or more digital signal processors (DSPs), application-specific ICs (ASICs), central processing units (CPUs), graphics processing units (GPUs), cryptoprocessors (specialized processors that execute cryptographic algorithms within hardware), server processors, or any other suitable processing devices. The computing sparsity balancing system 1300 may include a memory 1304, which may itself include one or more memory devices such as volatile memory (e.g., DRAM), nonvolatile memory (e.g., read-only memory (ROM)), flash memory, solid state memory, and/or a hard drive. In some embodiments, the memory 1304 may include memory that shares a die with the processing device 1302. In some embodiments, the memory 1304 includes one or more non-transitory computer-readable media storing instructions executable to perform operations for balancing sparsity in weight vectors, e.g., the method 1200 described above in conjunction with FIG. 12 or the operations performed by the sparsity balancing module 1150 described above in conjunction with FIG. 11. The instructions stored in the one or more non-transitory computer-readable media may be executed by the processing device 1302.

In some embodiments, the computing sparsity balancing system 1300 may include a communication chip 1312 (e.g., one or more communication chips). For example, the communication chip 1312 may be configured for managing wireless communications for the transfer of data to and from the computing sparsity balancing system 1300. The term "wireless" and its derivatives may be used to describe circuits, devices, sparsity balancing systems, methods, techniques, communications channels, etc., that may communicate data through the use of modulated electromagnetic radiation through a nonsolid medium. The term does not imply that the associated devices do not contain any wires, although in some embodiments they might not.

The communication chip 1312 may implement any of a number of wireless standards or protocols, including but not limited to Institute for Electrical and Electronic Engineers (IEEE) standards including Wi-Fi (IEEE 802.13 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1312 may operate in accordance with a Global Sparsity balancing system for Mobile Communication (GSM), General Packet Radio Service (GPRS), Universal Mobile Telecommunications Sparsity balancing system (UMTS), High Speed Packet Access (HSPA), Evolved HSPA (E-HSPA), or LTE network. The communication chip 1312 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1312 may operate in accordance with CDMA, Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1312 may operate in accordance with other wireless protocols in other embodiments. The computing sparsity balancing system 1300 may include an antenna 1322 to facilitate wireless communications and/or to receive other wireless communications (such as AM or FM radio transmissions).

In some embodiments, the communication chip 1312 may manage wired communications, such as electrical, optical, or any other suitable communication protocols (e.g., the Ethernet). As noted above, the communication chip 1312 may include multiple communication chips. For instance, a first communication chip 1312 may be dedicated to shorter-range wireless communications such as Wi-Fi or Bluetooth, and a second communication chip 1312 may be dedicated to longer-range wireless communications such as global indexing sparsity balancing system (GPS), EDGE, GPRS, CDMA, WiMAX, LTE, EV-DO, or others. In some embodiments, a first communication chip 1312 may be dedicated to wireless communications, and a second communication chip 1312 may be dedicated to wired communications.

The computing sparsity balancing system 1300 may include battery/power circuitry 1314. The battery/power circuitry 1314 may include one or more energy storage devices (e.g., batteries or capacitors) and/or circuitry for coupling components of the computing sparsity balancing system 1300 to an energy source separate from the computing sparsity balancing system 1300 (e.g., AC line power)

The computing sparsity balancing system 1300 may include a display device 1306 (or corresponding interface circuitry, as discussed above). The display device 1306 may include any visual indicators, such as a heads-up display, a computer monitor, a projector, a touchscreen display, a liquid crystal display (LCD), a light-emitting diode display, or a flat panel display, for example.

The computing sparsity balancing system 1300 may include an audio output device 1308 (or corresponding interface circuitry, as discussed above). The audio output device 1308 may include any device that generates an audible indicator, such as speakers, headsets, or earbuds, for example.

The computing sparsity balancing system 1300 may include an audio input device 1318 (or corresponding interface circuitry, as discussed above). The audio input device 1318 may include any device that generates a signal representative of a sound, such as microphones, microphone arrays, or digital instruments (e.g., instruments having a musical instrument digital interface (MIDI) output).

The computing sparsity balancing system 1300 may include a GPS device 1316 (or corresponding interface circuitry, as discussed above). The GPS device 1316 may be in communication with a satellite-based sparsity balancing system and may receive a location of the computing sparsity balancing system 1300, as known in the art.

The computing sparsity balancing system 1300 may include an other output device 1313 (or corresponding interface circuitry, as discussed above). Examples of the other output device 1313 may include an audio codec, a video codec, a printer, a wired or wireless transmitter for providing information to other devices, or an additional storage device.

The computing sparsity balancing system 1300 may include an other input device 1320 (or corresponding interface circuitry, as discussed above). Examples of the other input device 1320 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing sparsity balancing system 1300 may have any desired form Factor, such as a handheld or mobile computing sparsity balancing system (e.g., a cell phone, a smart phone, a mobile Internet device, a music player, a tablet computer, a laptop computer, a netbook computer, an ultrabook computer, a PDA, an ultramobile personal computer, etc.), a desktop computing sparsity balancing system, a server or other networked computing component, a printer, a scanner, a monitor, a set-top box, an entertainment control unit, a vehicle control unit, a digital camera, a digital video recorder, or a wearable computing sparsity balancing system. In some embodiments, the computing sparsity balancing system 1300 may be any other electronic device that processes data.

Select Examples

The following paragraphs provide various examples of the embodiments disclosed herein.

Example 1 provides a method for balancing sparsity in a deep neural network (DNN), the method including obtaining a weight vector that represents at least part of a weight matrix of a layer in a sequence of layers in the DNN, the weight vector including a first sequence of weights having different values; generating a bitmap based at least on the weight vector, the bitmap including a second sequence of bitmap elements, each of the bitmap elements in the second sequence corresponding to a different weight in the first sequence, where a value of a bitmap element is determined based at least on a value of the corresponding weight and an index of the bitmap element in the second sequence matches an index of the corresponding weight in the first sequence; generating a new bitmap from the bitmap by rearranging the bitmap elements in the second sequence based on the values of the bitmap elements; and assigning the weight vector to a plurality of processing elements in the layer of the DNN based on the new bitmap, each processing element configured to use a different subset of the weight vector to perform a multiply-accumulate operation.

Example 2 provides the method of example 1, where the layer is associated with an activation vector including a third sequence of activations, further including rearranging the activations in the third sequence based on the new bitmap.

Example 3 provides the method of example 1, where generating the bitmap based at least on the weight vector includes generating a weight bitmap based on the weight vector, the weight bitmap including a sequence of weight bitmap elements; generating an activation bitmap based on an activation associated with the layer, the activation bitmap including a sequence of activation bitmap elements; and generating the bitmap based on the weight bitmap and the activation bitmap.

Example 4 provides the method of example 3, where each respective bitmap element in the bitmap corresponds to a different weight bitmap element in the weight bitmap and a different activation bitmap element in the activation bitmap, the respective bitmap element has a value equal to a product of a value of the corresponding weight bitmap element and a value of the corresponding activation bitmap element.

Example 5 provides the method of example 1, where the DNN further includes a preceding layer that precedes the layer in the sequence, the preceding layer is associated with a third sequence of weights, further including rearranging the weights in the third sequence based on the new bitmap.

Example 6 provides the method of example 1, where the first sequence of weights includes non-zero valued weights and zero valued weights; the bitmap elements corresponding to the non-zero valued weights have values of one; and the bitmap elements corresponding to the zero valued weights have values of zero.

Example 7 provides the method of example 6, where rearranging the bitmap elements in the second sequence based on the values of the bitmap elements includes switching an index of a one valued bitmap element and an index of a zero valued bitmap element.

Example 8 provides the method of example 6, where rearranging the bitmap elements in the second sequence based on the values of the bitmap elements includes determining a first number of the one valued bitmap elements; determining a second number of the zero valued bitmap elements, the second number larger than the first number; determining an interval number based on the first and second numbers; and rearranging the bitmap elements in the second sequence so that every interval number of bitmap elements in the new bitmap includes at least one bitmap element having a value of one.

Example 9 provides the method of example 6, where rearranging the bitmap elements in the second sequence based on the values of the bitmap elements includes determining a first number of the one valued bitmap elements; determining a second number of the zero valued bitmap elements, the second number smaller than the first number; determining an interval number based on the first and second numbers; and rearranging the bitmap elements in the second sequence so that every interval number of bitmap elements in the new bitmap includes at least one bitmap element having a value of zero.

Example 10 provides the method of example 1, where assigning the weight vector to the plurality of processing elements in the layer of the DNN based on the new bitmap includes generating a new weight vector by repositioning one or more weights in the first sequence so that indices of each weight in the new weight vector match an index of the corresponding bitmap element in the new bitmap.

Example 11 provides one or more non-transitory computer-readable media storing instructions executable to perform operations for balancing sparsity in a deep neural network (DNN), the operations including obtaining a weight vector that represents at least part of a weight matrix of a layer in a sequence of layers in the DNN, the weight vector including a first sequence of weights having different values; generating a bitmap based at least on the weight vector, the bitmap including a second sequence of bitmap elements, each of the bitmap elements in the second sequence corresponding to a different weight in the first sequence, where a value of a bitmap element is determined based at least on a value of the corresponding weight and an index of the bitmap element in the second sequence matches an index of the corresponding weight in the first sequence; generating a new bitmap from the bitmap by rearranging the bitmap elements in the second sequence based on the values of the bitmap elements; and assigning the weight vector to a plurality of processing elements in the layer of the DNN based on the new bitmap, each processing element configured to use a different subset of the weight vector to perform a multiply-accumulate operation.

Example 12 provides the one or more non-transitory computer-readable media of example 11, where the layer is associated with an activation vector including a third sequence of activations, and the operations further include rearranging the activations in the third sequence based on the new bitmap.

Example 13 provides the one or more non-transitory computer-readable media of example 11, where generating the bitmap based at least on the weight vector includes generating a weight bitmap based on the weight vector, the weight bitmap including a sequence of weight bitmap elements; generating an activation bitmap based on an activation associated with the layer, the activation bitmap including a sequence of activation bitmap elements; and generating the bitmap based on the weight bitmap and the activation bitmap.

Example 14 provides the one or more non-transitory computer-readable media of example 13, where each respective bitmap element in the bitmap corresponds to a different weight bitmap element in the weight bitmap and a different activation bitmap element in the activation bitmap, the respective bitmap element has a value equal to a product of a value of the corresponding weight bitmap element and a value of the corresponding activation bitmap element.

Example 15 provides the one or more non-transitory computer-readable media of example 11, where the DNN further includes a preceding layer that precedes the layer in the sequence, the preceding layer is associated with a third sequence of weights, further including rearranging the weights in the third sequence based on the new bitmap.

Example 16 provides the one or more non-transitory computer-readable media of example 11, where the first sequence of weights includes non-zero valued weights and zero valued weights; the bitmap elements corresponding to the non-zero valued weights have values of one; and the bitmap elements corresponding to the zero valued weights have values of zero.

Example 17 provides the one or more non-transitory computer-readable media of example 16, where rearranging the bitmap elements in the second sequence based on the values of the bitmap elements includes switching an index of a one valued bitmap element and an index of a zero valued bitmap element.

Example 18 provides the one or more non-transitory computer-readable media of example 16, where rearranging the bitmap elements in the second sequence based on the values of the bitmap elements includes determining a first number of the one valued bitmap elements; determining a second number of the zero valued bitmap elements, the second number larger than the first number; determining an interval number based on the first and second numbers; and rearranging the bitmap elements in the second sequence so that every interval number of bitmap elements in the new bitmap includes at least one bitmap element having a value of one.

Example 19 provides the one or more non-transitory computer-readable media of example 16, where rearranging the bitmap elements in the second sequence based on the values of the bitmap elements includes determining a first number of the one valued bitmap elements; determining a second number of the zero valued bitmap elements, the second number smaller than the first number; determining an interval number based on the first and second numbers; and rearranging the bitmap elements in the second sequence so that every interval number of bitmap elements in the new bitmap includes at least one bitmap element having a value of zero.

Example 20 provides the one or more non-transitory computer-readable media of example 11, where assigning the weight vector to the plurality of processing elements in the layer of the DNN based on the new bitmap includes generating a new weight vector by repositioning one or more weights in the first sequence so that indices of each weight in the new weight vector match an index of the corresponding bitmap element in the new bitmap.

Example 21 provides an apparatus for balancing sparsity in a deep neural network (DNN), the apparatus including a computer processor for executing computer program instructions; and a non-transitory computer-readable memory storing computer program instructions executable by the computer processor to perform operations including obtaining a weight vector that represents at least part of a weight matrix of a layer in a sequence of layers in the DNN, the weight vector including a first sequence of weights having different values, generating a bitmap based at least on the weight vector, the bitmap including a second sequence of bitmap elements, each of the bitmap elements in the second sequence corresponding to a different weight in the first sequence, where a value of a bitmap element is determined based at least on a value of the corresponding weight and an index of the bitmap element in the second sequence matches an index of the corresponding weight in the first sequence, generating a new bitmap from the bitmap by rearranging the bitmap elements in the second sequence based on the values of the bitmap elements, and assigning the weight vector to a plurality of processing elements in the network of the DNN based on the new bitmap, each processing element configured to use a different subset of the weight vector to perform a multiply-accumulate operation.

Example 22 provides the apparatus of example 21, where the layer is associated with an activation vector including a third sequence of activations, and the operations further include rearranging the activations in the third sequence based on the new bitmap.

Example 23 provides the apparatus of example 21, where generating the bitmap based at least on the weight vector includes generating a weight bitmap based on the weight vector, the weight bitmap including a sequence of weight bitmap elements; generating an activation bitmap based on an activation associated with the layer, the activation bitmap including a sequence of activation bitmap elements; and generating the bitmap based on the weight bitmap and the activation bitmap.

Example 24 provides the apparatus of example 21, where the DNN further includes a preceding layer that precedes the layer in the sequence, the preceding layer is associated with a third sequence of weights, further including rearranging the weights in the third sequence based on the new bitmap.

Example 25 provides the apparatus of example 21, where assigning the weight vector to the plurality of processing elements in the network of the DNN based on the new bitmap includes generating a new weight vector by repositioning one or more weights in the first sequence so that indices of each weight in the new weight vector match an index of the corresponding bitmap element in the new bitmap.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. A method for balancing sparsity in a deep neural network (DNN), the method including:
   obtaining a weight vector that represents at least part of a weight matrix of a layer in a sequence of layers in the DNN, the weight vector comprising a first sequence of weights having different values;
   generating a bitmap based at least on the weight vector, the bitmap comprising a second sequence of bitmap elements, each of the bitmap elements in the second sequence corresponding to a different weight in the first sequence, wherein a value of a bitmap element is determined based at least on a value of the corresponding weight and an index of the bitmap element in the second sequence matches an index of the corresponding weight in the first sequence;
   generating a new bitmap from the bitmap by rearranging the bitmap elements in the second sequence based on the values of the bitmap elements; and
   assigning the weight vector to a plurality of processing elements in the layer of the DNN based on the new bitmap, wherein a multiply-accumulate operation is to be performed by each one of the plurality of processing elements using a different subset of the weight vector.

2. The method of claim 1, wherein the layer is associated with an activation vector including a third sequence of activations, further comprising:
   rearranging the activations in the third sequence based on the new bitmap.

3. The method of claim 1, wherein generating the bitmap based at least on the weight vector comprises:
   generating a weight bitmap based on the weight vector, the weight bitmap comprising a sequence of weight bitmap elements;
   generating an activation bitmap based on an activation associated with the layer, the activation bitmap comprising a sequence of activation bitmap elements; and
   generating the bitmap based on the weight bitmap and the activation bitmap.

4. The method of claim 3, wherein each respective bitmap element in the bitmap corresponds to a different weight bitmap element in the weight bitmap and a different activation bitmap element in the activation bitmap, the respective bitmap element has a value equal to a product of a value of the corresponding weight bitmap element and a value of the corresponding activation bitmap element.

5. The method of claim 1, wherein the DNN further comprises a preceding layer that precedes the layer in the sequence, the preceding layer is associated with a third sequence of weights, further comprising:
   rearranging the weights in the third sequence based on the new bitmap.

6. The method of claim 1, wherein:
   the first sequence of weights includes non-zero valued weights and zero valued weights;
   the bitmap elements corresponding to the non-zero valued weights have values of one; and
   the bitmap elements corresponding to the zero valued weights have values of zero.

7. The method of claim 6, wherein rearranging the bitmap elements in the second sequence based on the values of the bitmap elements comprises:
   switching an index of a one valued bitmap element and an index of a zero valued bitmap element.

8. The method of claim 6, wherein rearranging the bitmap elements in the second sequence based on the values of the bitmap elements comprises:
   determining a first number of the one valued bitmap elements;
   determining a second number of the zero valued bitmap elements, the second number larger than the first number;
   determining an interval number based on the first and second numbers; and
   rearranging the bitmap elements in the second sequence so that every interval number of bitmap elements in the new bitmap includes a one valued bitmap element.

9. The method of claim 6, wherein rearranging the bitmap elements in the second sequence based on the values of the bitmap elements comprises:
   determining a first number of the one valued bitmap elements;
   determining a second number of the zero valued bitmap elements, the second number smaller than the first number;
   determining an interval number based on the first and second numbers; and
   rearranging the bitmap elements in the second sequence so that every interval number of bitmap elements in the new bitmap includes a zero valued bitmap element.

10. The method of claim 1, wherein assigning the weight vector to the plurality of processing elements in the layer of the DNN based on the new bitmap comprises:
    generating a new weight vector by repositioning one or more weights in the first sequence so that an index of each weight in the new weight vector matches an index of the corresponding bitmap element in the new bitmap.

11. One or more non-transitory computer-readable media storing instructions executable to perform operations for balancing sparsity in a deep neural network (DNN), the operations comprising:
    obtaining a weight vector that represents at least a part of a weight matrix of a layer in a sequence of layers in the DNN, the weight vector comprising a first sequence of weights having different values;
    generating a bitmap based at least on the weight vector, the bitmap comprising a second sequence of bitmap elements, each of the bitmap elements in the second sequence corresponding to a different weight in the first sequence, wherein a value of a bitmap element is determined based at least on a value of the corresponding weight and an index of the bitmap element in the second sequence matches an index of the corresponding weight in the first sequence;
    generating a new bitmap from the bitmap by rearranging the bitmap elements in the second sequence based on the values of the bitmap elements; and
    assigning the weight vector to a plurality of processing elements in the layer of the INN based on the new bitmap, wherein a multiply-accumulate operation is to be performed by each one of the plurality of processing elements using a different subset of the weight vector.

12. The one or more non-transitory computer-readable media of claim 11, wherein the layer is associated with an activation vector including a third sequence of activations, and the operations further comprise:
    rearranging the activations in the third sequence based on the new bitmap.

13. The one or more non-transitory computer-readable media of claim 11, wherein generating the bitmap based at least on the weight vector comprises:
generating a weight bitmap based on the weight vector, the weight bitmap comprising a sequence of weight bitmap elements;
generating an activation bitmap based on an activation associated with the layer, the activation bitmap comprising a sequence of activation bitmap elements; and
generating the bitmap based on the weight bitmap and the activation bitmap.

14. The one or more non-transitory computer-readable media of claim 13, wherein each respective bitmap element in the bitmap corresponds to a different weight bitmap element in the weight bitmap and a different activation bitmap element in the activation bitmap, the respective bitmap element has a value equal to a product of a value of the corresponding weight bitmap element and a value of the corresponding activation bitmap element.

15. The one or more non-transitory computer-readable media of claim 11, wherein the DNN further comprises a preceding layer that precedes the layer in the sequence, the preceding layer is associated with a third sequence of weights, further comprising:
rearranging the weights in the third sequence based on the new bitmap.

16. The one or more non-transitory computer-readable media of claim 11, wherein:
the first sequence of weights includes non-zero valued weights and zero valued weights;
the bitmap elements corresponding to the non-zero valued weights have values of one; and
the bitmap elements corresponding to the zero valued weights have values of zero.

17. The one or more non-transitory computer-readable media of claim 16, wherein rearranging the bitmap elements in the second sequence based on the values of the bitmap elements comprises:
switching an index of a one valued bitmap element and an index of a zero valued bitmap element.

18. The one or more non-transitory computer-readable media of claim 16, wherein rearranging the bitmap elements in the second sequence based on the values of the bitmap elements comprises:
determining a first number of the one valued bitmap elements;
determining a second number of the zero valued bitmap elements, the second number larger than the first number;
determining an interval number based on the first and second numbers; and
rearranging the bitmap elements in the second sequence so that every interval number of bitmap elements in the new bitmap includes at least one bitmap element having a value of one.

19. The one or more non-transitory computer-readable media of claim 16, wherein rearranging the bitmap elements in the second sequence based on the values of the bitmap elements comprises:
determining a first number of the one valued bitmap elements;
determining a second number of the zero valued bitmap elements, the second number smaller than the first number;
determining an interval number based on the first and second numbers; and
rearranging the bitmap elements in the second sequence so that every interval number of bitmap elements in the new bitmap includes at least one bitmap element having a value of zero.

20. The one or more non-transitory computer-readable media of claim 11, wherein assigning the weight vector to the plurality of processing elements in the layer of the DNN based on the new bitmap comprises:
generating a new weight vector by repositioning one or more weights in the first sequence so that indices of each weight in the new weight vector match an index of the corresponding bitmap element in the new bitmap.

21. An apparatus for balancing sparsity in a deep neural network (DNN), the apparatus comprising:
a computer processor for executing computer program instructions; and
a non-transitory computer-readable memory storing computer program instructions executable by the computer processor to perform operations comprising:
obtaining a weight vector that represents at least part of a weight matrix of a layer in a sequence of layers in the DNN, the weight vector comprising a first sequence of weights having different values,
generating a bitmap based at least on the weight vector, the bitmap comprising a second sequence of bitmap elements, each of the bitmap elements in the second sequence corresponding to a different weight in the first sequence,
wherein a value of a bitmap element is determined based at least on a value of the corresponding weight and an index of the bitmap element in the second sequence matches an index of the corresponding weight in the first sequence,
generating a new bitmap from the bitmap by rearranging the bitmap elements in the second sequence based on the values of the bitmap elements, and
assigning the weight vector to the plurality of processing elements in the layer of the DNN based on the new bitmap, wherein a multiply-accumulate operation is to be performed by each one of the plurality of processing elements using a different subset of the weight vector.

22. The apparatus of claim 21, wherein the layer is associated with an activation vector including a third sequence of activations, and the operations further comprise:
rearranging the activations in the third sequence based on the new bitmap.

23. The apparatus of claim 21, wherein generating the bitmap based at least on the weight vector comprises:
generating a weight bitmap based on the weight vector, the weight bitmap comprising a sequence of weight bitmap elements;
generating an activation bitmap based on an activation associated with the layer, the activation bitmap comprising a sequence of activation bitmap elements; and
generating the bitmap based on the weight bitmap and the activation bitmap.

24. The apparatus of claim 21, wherein the DNN further comprises a preceding layer that precedes the layer in the sequence, the preceding layer is associated with a third sequence of weights, further comprising:
rearranging the weights in the third sequence based on the new bitmap.

25. The apparatus of claim 21, wherein assigning the weight vector to the plurality of processing elements in the layer of the DNN based on the new bitmap comprises:

generating a new weight vector by repositioning one or more weights in the first sequence so that indices of each weight in the new weight vector match an index of the corresponding bitmap element in the new bitmap.

* * * * *

UNITED STATES PATENT AND TRADEMARK OFFICE
CERTIFICATE OF CORRECTION

| | | |
|---|---|---|
| PATENT NO. | : 12,367,380 B2 | Page 1 of 1 |
| APPLICATION NO. | : 17/534976 | |
| DATED | : July 22, 2025 | |
| INVENTOR(S) | : Arnab Raha et al. | |

It is certified that error appears in the above-identified patent and that said Letters Patent is hereby corrected as shown below:

On the Title Page

On Page 2, in Item (56), under "Other Publications", in Column 2, Line 12, delete "ak.," and insert -- al., --, therefor.

In the Claims

In Column 30, Claim 11, Line 58, delete "INN" and insert -- DNN --, therefor.

Signed and Sealed this
Twenty-sixth Day of August, 2025

Coke Morgan Stewart
*Acting Director of the United States Patent and Trademark Office*